United States Patent Office 3,300,478
Patented Jan. 24, 1967

3,300,478
ARABINOFURANOSYL 2',5'- AND 3'-5'-DINUCLE-
OSIDE PHOSPHATES AND PROCESS THEREFOR
William J. Wechter, Kalamazoo, Mich., assignor to The
Upjohn Company, Kalamazoo, Mich., a corporation of
Delaware
No Drawing. Filed June 1, 1965, Ser. No. 460,553
25 Claims. (Cl. 260—211.5)

The present invention is concerned with novel compounds and, more particularly, 2',5'- and 3',5'-dinucleoside phosphates, the pharmaceutically acceptable salts thereof, intermediates therefor, and a process of the preparation thereof.

The novel final products, the novel intermediates and the generic process of production thereof can be illustratively represented by the following synthetic sequences A, B and C:

A. *Preparation of the intermediate 5'-phosphates and intermediates of Formula II.*

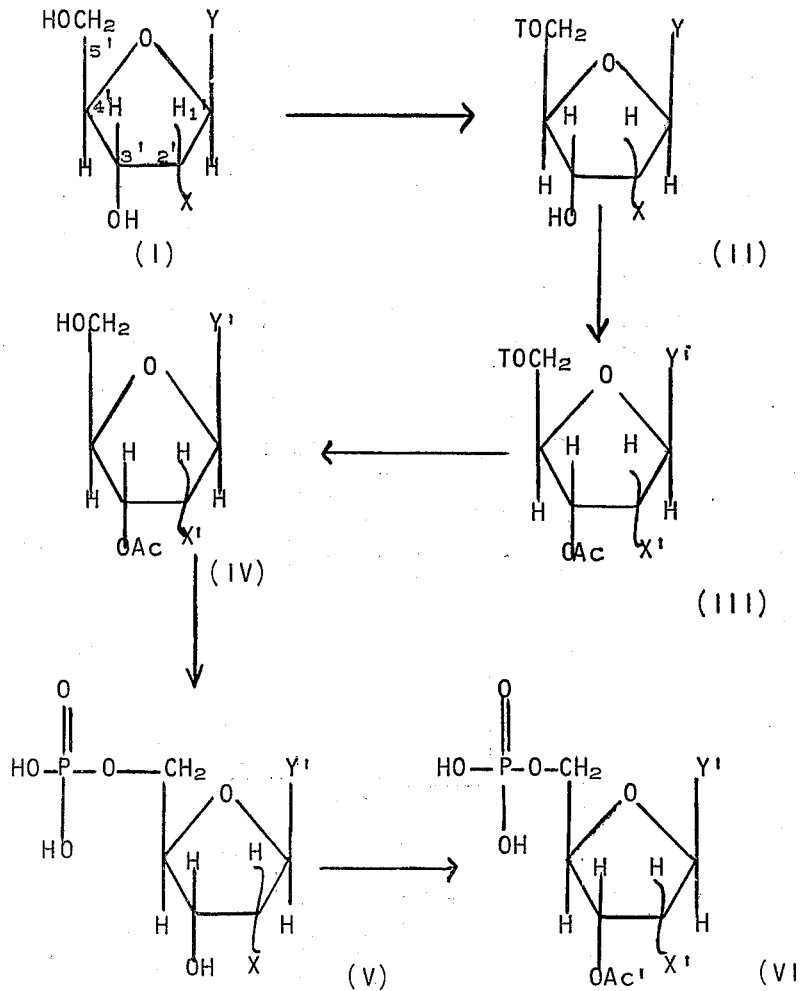

where Ac and Ac' are selected from the group consisting of acyl radicals of hydrocarbon carboxylic acids containing from 2 to 12 carbon atoms, inclusive, and anisoyl, wherein T is selected from the group consisting of triphenylmethyl, (p - methoxyphenyl)diphenylmethyl and bis(p-methoxyphenyl)phenylmethyl, wherein X is selected from the group consisting of hydrogen, $\alpha$-OH, and $\beta$-OH, wherein X' is selected from the group consisting of hydrogen, and $\alpha$-O-Acyl and $\beta$-O-Acyl, in which the acyl group is defined as above, wherein Y is selected from the group consisting of cytosin-1-yl, uracil-1-yl, thymin-1-yl (alternatively, 5-methyluracil-1-yl), adenin-9-yl (alternatively, 6-aminopurin-9-yl), guanin-9-yl (alternatively, 2-amino-6-hydroxypurin-9-yl), 6-mercaptopurin-9-yl, uracil-3-yl, 5-fluorouracil-1-yl, 5-chlorouracil-1-yl, 5-bromouracil-1-yl, 5-iodouracil-1-yl, 5-trifluoromethyluracil-1-yl, hypoxanthin-9-yl (alternatively, 6 - hydroxypurin-9-yl, xanthin-9-yl (alternatively, 2,6-dihydroxypurin-9-yl), 5 methylcytosin-1-yl and 3-methylcytosin-1-yl, and wherein Y' signifies a group like Y in which groups capable of acylating, e.g., amino groups, are also acylated and thus protected from reacting with the phosphate esters in positions other than desired.

Thus, Y' is selected from the group consisting of $N^4$-acylcytosin-1-yl, uracil-1-yl, thymin-1-yl, $N^6$-acyladenin-9-yl, $N^2$-acylguanin-9-yl, 6-mercaptopurin-9-yl, uracil-3-yl, 5-fluorouracil-1-yl, 5-chlorouracil-1-yl, 5-bromouracil-1-yl, 5-iodouracil-1-yl, 5-trifluoromethyluracil-1-yl, hypoxanthin-9-yl, xanthin-9-yl, $N^4$-acyl-5-methylcytosin-1-yl, and $N^4$-acyl-3-methylcytosin-1-yl, wherein the acyl group is Ac, defined as hereinabove.

B. *Preparation of intermediates for the phosphorylation in positions 2'-0 or 3'-0.*

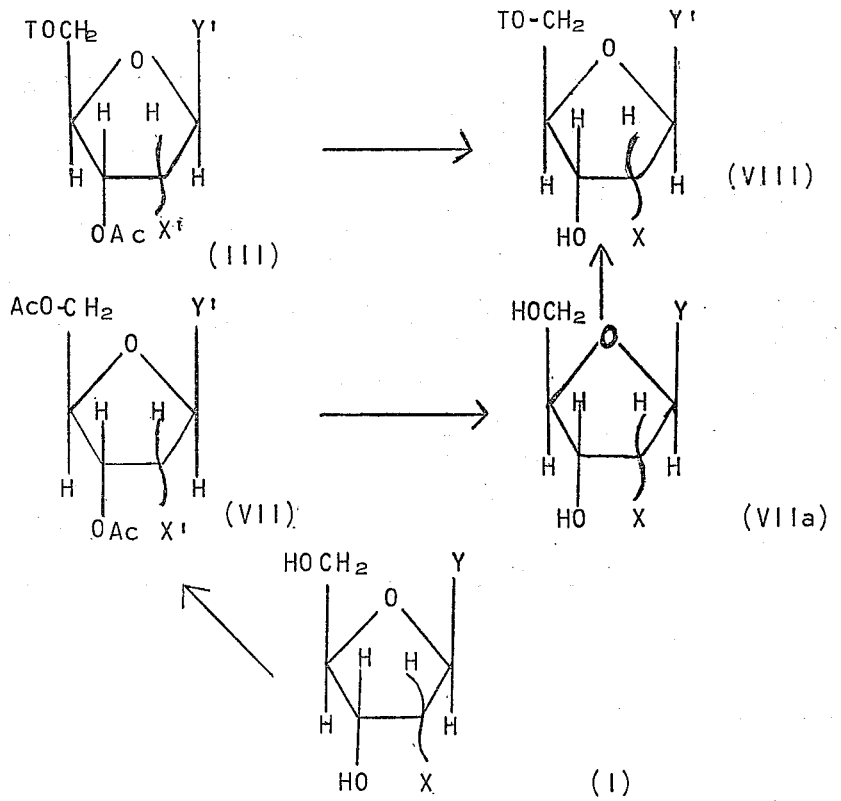

wherein Ac, T, Y, Y' X and X' are defined as hereinabove. Obviously if the sugar moiety of III is deoxyribose, i.e., X'=T, and if Y' is not acylated, i.e., Y'=Y as defined above, VIII would be identical with a compound of Formula II, and, thus, compound II would be used for the condensation.

C. *Preparation of end products.*

A compound of Formula VIII of (II under the circumstances described above) is then condensed with a compound of Formula VI to give the following new compounds:

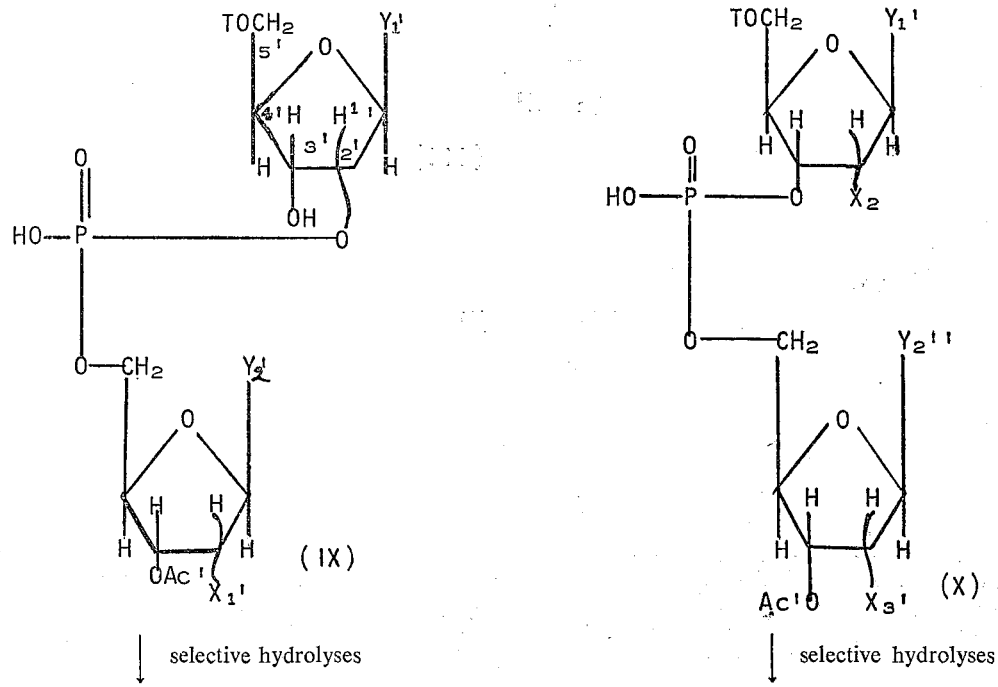

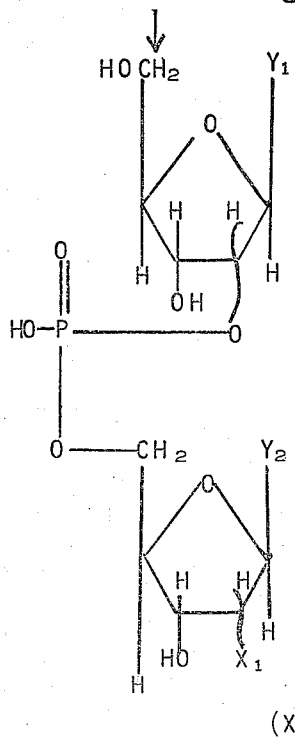

(XI)

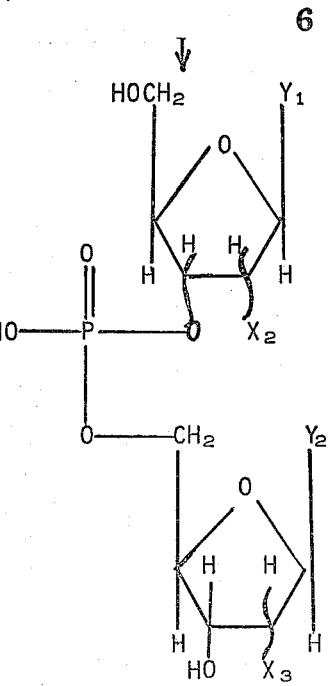

(XII)

wherein $X_1$ is selected from the group consisting of hydrogen, α-hydroxy and β-hydroxy with the proviso that only one of the furanose rings in the same compound can be a ribofuranose, wherein the combination $X_2$ and $X_3$ is selected from the group of combinations consisting of H, α-OH; H, β-OH; α-OH, β-OH; β-OH, α-OH and β-OH, β-OH; wherein $X_1$ is selected from the group consisting of hydrogen, α-O-acyl and β-O-acyl, wherein acyl is a member of the group Ac defined as hereinabove, with the proviso that only one of the furanose rings can be a ribofuranose, wherein the combination $X_2$ and $X_3'$ is selected from the group consisting of H, α-O-acyl; H, β-O-acyl; α-OH, β-O-acyl, β-OH; α-OAc; and β-OH, β-O-Ac; and in which acyl is defined as above, wherein $Y_1$ and $Y_2$ have the same definition as Y and wherein $Y_1'$ and $Y_2''$ have the same definition as $Y_2$.

The distinction of $Y_1$, $Y_2$, $Y_1'$ and $Y_2''$ has been made to indicate that these substituents though from the same groups Y and Y' do not need to be identical in compounds VII, VIII, IX and X, i.e., $Y_1$ and $Y_2$ in compound XI can be the same ($Y_1=Y_2$), but do not need to be the same.

The vertical wavy line ∫ with substituents at both ends is used to indicate that the substituents can be in α-(below the plane of the ring) or in the β-position (above the plane of the ring).

Examples of acyl groups of hydrocarbon carboxylic acid, as herein used, include acetyl, propionyl, butyryl, valeryl, isovaleryl, hexanoxyl, heptanoyl, octanoyl, nonanoyl, decanoyl, undecanoyl, lauroyl, benzoyl, phenylacetyl, phenylpropionyl, p-toluoyl, β-cyclopentylpropionyl, and the like.

The heterocyclic radicals Y are obtained when a hydrogen atom is removed from the parent compound at the position indicated by the number prior to the ending "-yl." The radicals Y have therefore the following formulae:

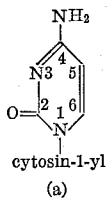

cytosin-1-yl (a)

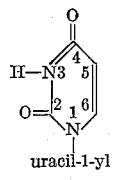

uracil-1-yl (b)

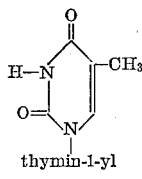

thymin-1-yl (c)

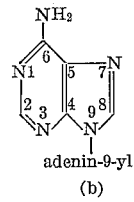

adenin-9-yl (b)

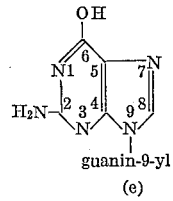

guanin-9-yl (e)

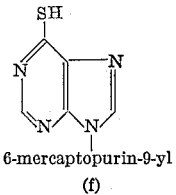

6-mercaptopurin-9-yl (f)

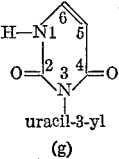

uracil-3-yl (g)

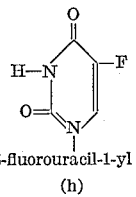

5-fluorouracil-1-yl (h)

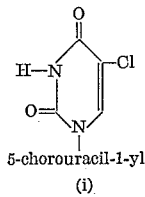

5-chorouracil-1-yl (i)

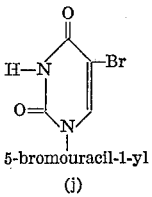

5-bromouracil-1-yl (j)

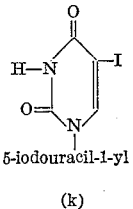

5-iodouracil-1-yl (k)

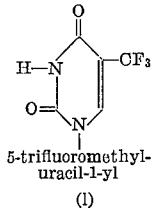

5-trifluoromethyl-uracil-1-yl (l)

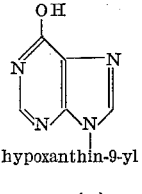

hypoxanthin-9-yl (m)

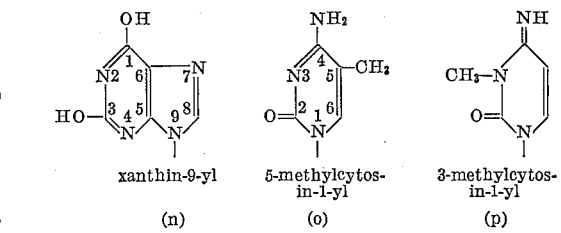

xanthin-9-yl (n)

5-methylcytos-in-1-yl (o)

3-methylcytos-in-1-yl (p)

The above compounds, uracil (b) and substituted-uracil radicals (c), (g), (h), (i), (j), (k) and (l) are written in the keto form, rather than in the tautomeric enol form. Likewise, other of the above radicals can be written in tautomeric form. For example, the cytosine and substituted-cytosine radicals (a) and (o) are written in the amino form, but they can also be written in the tautomeric imino form. In chemical compounds, e.g., the compounds of this invention, such forms may frequently be present in an equilibrium mixture.

The process of the present invention is essentially designed to protect those positions in the heterocyclic moiety as well as in the sugar moiety of the molecule which can react with phosphoric acid or the phosphorylating agent and leave at the same time the desired positions 2′ or 3′ and 5′, open to react with the phosphorylating agent. While the process can therefore slightly vary, depending on the selected nucleoside and protecting agent, the basic process can be described as shown in the before-disclosed sequence of formulae, in the following manner:

A compound of Formula I as free base or as a salt of a mineral acid such as hydrochloric acid is etherified on the 5′-position, for example, with triphenylchloromethane or a methoxy-substituted triphenylchloromethane, to give the corresponding 1-(5′-O-triphenylmethyl-β-D-furanosyl) compound (II); compound II is thereupon submitted to an acylating agent such as acetic anhydride, propionic anhydride, benzoyl chloride, to produce acylation on the hydroxy groups 2′ and 3′ and, if present, on the amino group of the N-heterocyclic moiety, e.g., cystosine, adenine, thus furnishing the corresponding 1-(2′,3′-di-O-acyl-5′-O-triphenylmethyl - β - D-furanosyl) compound (III). Product III without further purification is submitted to an acid catalyzed ether cleavage to give the corresponding 1-(2′,3′-di-O-acyl-β-D-furanosyl) compound (IV). Compound IV was thereupon treated with a selected phosphorylating agent, for example, 2-cyanoethyl phosphate, in the presence of a selected condensing agent such as dicychlohexylcarbodiimide and then with an alkali base such as lithium hydroxide, to give 1-β-D-furanosyl 5′-phosphate compound (V). Compound V is thereupon reacylated to give the corresponding 1-(2′,3′-di-O-acyl-β-D-furanosyl)5′-phosphate compound of Formula VI. Compound VI is thereupon condensed with a nucleoside of Formula VIII (respectively II, under the conditions outlined) to give the compounds of Formulae IX and X. These compounds are then selectively hydrolyzed first with a base (e.g., with ammonium hydroxide in methanol) then with an acid to provide the dinucleoside XI and XII.

The novel dinucleoside phosphates of Formulae XI and XII exhibit significant cytotoxic activity in vitro, particularly against KB tumor cells and against viruses, particularly the different types of Herpes, Coe, and Vaccinia viruses. For this reason, the products can be employed for cleansing glassware and instruments used in the growing of tissue cultures for virus and tumor research, washing excised tumor tissue, intended for transplant into animals to inhibit the growth of any KB tumor cells that might otherwise seed surrounding tissues, or be transported to other parts of the animal body. The antiviral activity can also be used to prepare fungal and bacterial cultures, uncontaminated by viral phages, e.g., phage-free antibiotic-producing streptomyces cultures. Compounds of Formula XII cured *Herpes keratitis* in the eye of virus infected domestic animals, e.g., rabbits.

The starting material of Formula I is known in the art (see, e.g., Michaelson, The Chemistry of Nucleosides and Nucleotides, Academic Press, London and New York, 1963; Catalogues of Zellstoffabrik Waldhof Germany 1964 and the like). Other starting compounds are disclosed in the preparations.

In carrying out the process of the present invention, a compound of Formula I as hydrochloride, hydrobromide or other salt, or as free base, is treated with an etherifying agent in an organic basic solvent. As etherifying agent, triphenylchloromethane, triphenylbromomethane, methoxy-substituted triphenylmethylbromo- and chloromethane, e.g. (p-methoxyphenyl) diphenylchloromethane, bis(p-methoxyphenyl)phenylchloro- and bromoethane and the like are generally employed. As an organic base, pyridine, picolines and lutidines, ethylpyridines, and the like can be used with pyridine preferred. The reaction can be carried out at a temperature between 0 to 60° and is preferably carried out at room temperature between 20 and 30°. The reaction time at room temperature is between 6 hours and 10 days. In the preferred embodiment of this invention, Compound I is stirred in pyridine solution with an approximate equivalent amount of triphenylchloromethane, triphenyl-bromoethane, or p-methoxy analogues thereof.

The acylation of the thus-obtained product, a 1-(5′-O-triphenylmethyl-β-D-furanosyl) Compound 11, is carried out with an acylating agent selected from the group consisting of acyl chlorides, acyl bromides, and acid anhydrides of hydrocarbon carboxylic acids having from 2 to 12 carbon atoms, inclusive, and anisoyl chloride. Acyl chlorides and acyl halides particularly used include benzoyl chloride, anisoyl chloride, para-ethyl-benzoyl chloride, para-methylbenzoyl bromide, β-cyclopentylpropionyl chloride, lauroyl chloride, decanoyl chloride, octanoyl bromide, and the like. Acid anhydrides particularly used in this invention are acetic anhydrides, propionic anhydrides, butyric anhydrides, valeric anhydrides, phenylacetic anhydrides, phenylpropionic anhydride, hexanoic anhydride, and the like. In the preferred embodiment of this invention the reaction is carried out in dry pyridine at room temperature between 20 to 30° under continuous stirring for a period of 4 to 48 hours. After this period the material is recovered by standard procedures such as pouring the pyridine solution into water, decanting the water and purifying the remaining material by conventional means such as chromatography, extractions, recrystallization, or a combination of these methods and the like. The thus-obtained 1-(2′,3′-di-O-acyl-5′-O-triphenylmethyl-β-D-furanosyl) compound is then submitted to ether cleavage, for example, with acetic acid or with acetic acid containing a hydrogen halide, e.g., hydrogen chloride, hydrogen bromide or hydrogen iodide, to give the corresponding 1-(2′,3′-di-O-acyl-β-D-furanosyl) compound.

The phosphorylation of the protected 1-(2′,3′-di-O-acyl-β-D-arabinofuranosyl)cytosine is carried out by the method of G. M. Tener, J. Am. Chem. Soc. 83, 159 (1959). Solvents used in this procedure are anhydrous, non-hydroxylic solvents in which the phosphorylating agent, a phosphate ester, is also soluble. Such solvents are pyridine, picoline, lutidine, or the like. Neutral solvents such as dimethyl sulfoxide, tetrahydrofuran, N,N-dimethylacetamide or dioxane can be used, providing that for each mole of phosphorylating agent one equivalent of basic reagent, e.g., pyridine, is added. Other representative bases for this reaction include picolines, lutidines or trialkylamines.

Phosphate esters, which are readily cleaved by a strong base, e.g., an alkali metal hydroxide, are employed, and particularly useful for this reaction are 2-substituted ethyl dihydrogenphosphates of the formula:

$$Z-\underset{R}{CH}-CH_2-O-\overset{O}{\underset{OH}{P}}-OH$$

wherein R is selected from the group consisting of hydrogen and lower alkyl, wherein Z is a strongly electronegative substituent selected from the group consisting of —C≡N; —SO₂R″; —C—R″;

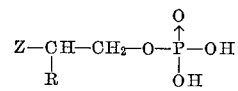

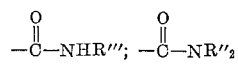

—$CF_3$; —$CCl_3$; —$CBr_3$; —$Cl$; —$Br$; —$F$; —$\overset{+}{N}\equiv R''_3$; —$\overset{+}{NH}_3$; —$IO_2$; —$COOR'''$; —$NO_2$ and the like; wherein $R''$ is selected from the group consisting of lower alkyl and aryl, and wherein $R'''$ is selected from the group consisting of hydrogen, lower alkyl and aryl. The preferred 2-substituted-ethyl dihydrogenphosphate is 2-cyanoethyl dihydrogenphosphate.

Instead of a 2-substituted ethyl dihydrogenphosphate, other dihydrogenphosphate esters which are easily cleaved by a base may be used, for example, o- and p-substituted-phenyl dihydrogenphosphates, such as o- and p-carboxyphenyldihydrogenphosphate, o- and p-carbamoylphenyl dihydrogenphosphate, and o- and p-cyanophenyl dihydrogenphosphate.

In the solution containing the β-substituted-ethyl-dihydrogenphosphate or o- or p-substituted-phenyl dihydrogenphosphate, the before-mentioned acyl-protected arabinofuranosylcytosine was dissolved, if necessary under application of heating between 30 to 50° C. After all 1-(2′,3′-di-O-acyl-β-D-furanosyl) Compound IV had been dissolved, a condensing agent is added such as an alkyl- or aryl-substituted carbodiimide, preferably dicyclohexyl carbodiimide. Other compounds unrelated to carbodiimides which can be used as reagents are p-toluenesulfonyl chloride, methoxyacetylene, keteneimines, trichloroacetonitrile, substituted cyanamides, α-substituted acetonitriles, alkyl- and arylisocyanates, carboxylic acid chlorides, aralkyl chlorocarbonates and the like.

The preferred temperatures for this reaction are those temperatures around and slightly above room temperature, that is, temperatures between 20 and 40° C.; however, the reaction can be carried out at lower temperatures, such as 5° C. and up to temperatures of about 75° C. without undue side reactions. At a temperature between 20 and 40° C. and at reasonable concentration, the time required for the reaction to be completed is about 4 to 48 hours. However, reaction times between 1 hour and 8 days can be used; the reaction time should be significantly prolonged at greater dilution.

The concentration of the reactants is not critical. Equimolecular amounts of 1-(2′,3′-di-O-acyl-β-D-furanosyl) Compound IV, the 2-substituted ethyl phosphate and the base catalyst, give approximately quantitative conversion, if sufficient time is allowed for the reaction to be completed. In order to shorten the time of reaction, a 3 to 4 times molar excess of the 2-substituted ethyl dihydrogenphosphate over 1-(2′,3′-di-O-acyl-β-D-furanosyl) compound is preferred. After the reaction is terminated, a small amount of water is added to inactivate the excess of phosphorylating reagent and of the condensing agent. The solution is then filtered to remove insoluble material such as the disubstituted ureas resulting from the reaction of carbodiimides with water, and the filtrate is used for the next step, the cleavage reaction.

The solution obtained from the prior step is reacted with an aqueous alkali hydroxide solution to produce the desired cleavage. In the preferred embodiment of the invention the solution containing the 1-(2′,3′-di-O-acyl-β-D-furanosyl) compound 5′-yl 2-cyanoethyl phosphate is first concentrated until a small volume is obtained, concentration being usually achieved under vacuum. When the volume is low enough so that the cooled material becomes a viscous residue, a base, e.g., aqueous lithium, sodium or potassium hydroxide of a 0.4 to 2 normality, is added until the pH of the solution rises between 12 to 13″ at a low temperature between —10 to +20° C. If the reaction is carried out under vigorous conditions, higher temperature or longer periods, then a compound V is obtained in which the base substituent is $Y_1$ instead of $Y'$. After termination of the reaction, the mixture is cooled and filtered. From the filtrate the product V is recovered by conventional methods such as extraction, evaporation, precipitation in the form of insoluble phosphate salts, absorption and desorption on resins, recrystallization and the like.

Depending on the reaction conditions, used in the base hydrolysis, acyl groups on amino nitrogen, e.g., on the $N^4$ of cytosin and substituted cytosins, $N^6$ of adenine and $N^2$ of guanine, can remain or be eliminated. At low temperatures 0–20°, and short reaction period, 10–40 minutes, the acyl group on $N^4$ in cytosin will remain. If the alkali solution containing the organic 2-cyanoethylphosphate is kept at temperatures between 75–100°, or at lower temperatures and longer reaction periods, the acyl groups are removed.

The thus-obtained 1-β-D-furanosyl 5′-dihydrogenphosphate (V) is then reacylated in the same manner as Compound II, usually in anhydrous pyridine with an acylating agent selected from the group consisting of anhydrides and halides of hydrocarbon carboxylic acids containing from 2 to 12 carbon atoms, inclusive, to give the corresponding 5′-phosphate of 1-(2′,3′-di-O-acyl-β-D-furanosyl) Compound VI.

Compound VIII, is prepared by either acylating a compound of Formula I to obtain Compound VII saponifying Compound VII to obtain a compound of VIIa and etherifying Compound VIIa, or by saponifying Compound III. The etherification and acylation are performed as in the prior described steps I→II and II→III. The saponification is made at a low temperature when an acylated amino group is present. In the preferred embodiment of this invention the saponification is carried out in a water-alkanol mixture, methyl or ethyl alcohol usually, with sufficient base present to have a pH greater than 11. As base normal sodium, potassium or lithium hydroxide or ammonium hydroxide is used. The precipitates are collected rapidly and freed of base solution by washing with water. Additional treatment with base, washing, extraction and crystallization are used to purify the product.

The prior-obtained product VI is thereupon condensed with a furanoside of Formula VIII (or of Formula II if $Y_1'$ and $Y_1$ are identical). In the preferred embodiment of this invention, the condensation is carried out with an equimolecular amount of the two Compounds VI and VIII in anhydrous pyridine in the presence of dicyclohexylcarbodiimide at room temperature, about 30° C. Instead of pyridine as solvent, alkyl-substituted pyridines such as α-, β- or γ-methylpyridine, disubstituted alkylpyridines, and trisubstituted alkylpyridines, dimethylformamide, diethylformamide, and the like can be used. The reaction can be carried out at temperatures between 0 to 60° C., but room temperature, between 20 to 30°, is preferred. The reaction period is between 4 hours to 10 days. The product is a 3′,5′-dinucleoside phosphate of Formula X, if $X_2(=X)=H$ or is a mixture of 2′, 5′-and 3′,5′-phosphates nucleoside of Formulae IX and X (if X in Formulae II or VIII is OH) which can be isolated by conventional methods, particularly by extracting impurities with a water-immiscible solvent, e.g., petroleum ether, benzene, Skellysolve hexanes, carbon tetrachloride, methylene chloride, ether and lyophilizing the remaining aqueous reaction mixture. Extraction and lyophilization is often repeated to rid the aqueous reaction mixture of volatile by-products. Products IX and X are separated by standard methods, particularly chromatography with the aid of ion exchange resins, solvent extraction in a Craig apparatus continuous flow electrophoresis and the like, and can be further purified by standard methods, e.g., recrystallization, paper chromatography and high voltage electrophoresis.

The thus-obtained ester products are then treated with anhydrous ammoniacal methanol or other aqueous base to hydrolyze the acyl groups followed by aqueous acids to cleave the ether bond and to give the dinucleoside phosphates XI and XII.

In these hydrolyses, part of the cytosine moiety may lose the acylamino group so as to give a uracilyl nucleoside phosphate.

Products XI and XII are then isolated and purified by methods used for Compounds IX and X.

The following preparations and examples are illustrative of the products and process of the present invention but are not to be construed as limiting.

Soc. 73, 1650 (1951)], 4.0 g. of purified diatomaceous earth (Celite) in 325 ml. of xylene was dried by azeotropic distillation (50 mls.). A solution of 4.39 g. (10.0 millimoles) of crude, syrupy 2,3,5-tri-O-benzyl-D-arabinofuranosyl-chloride [C. P. J. Glaudemans and H. G. Fletcher, Jr., J. Org. Chem. 28, 3004 (1963)] in 50 ml. of purified xylene was added to the hot, stirred suspension and the latter was refluxed with continued stirring

PREPARATION 1

*9-β-D-arabinofuranosylguanine*

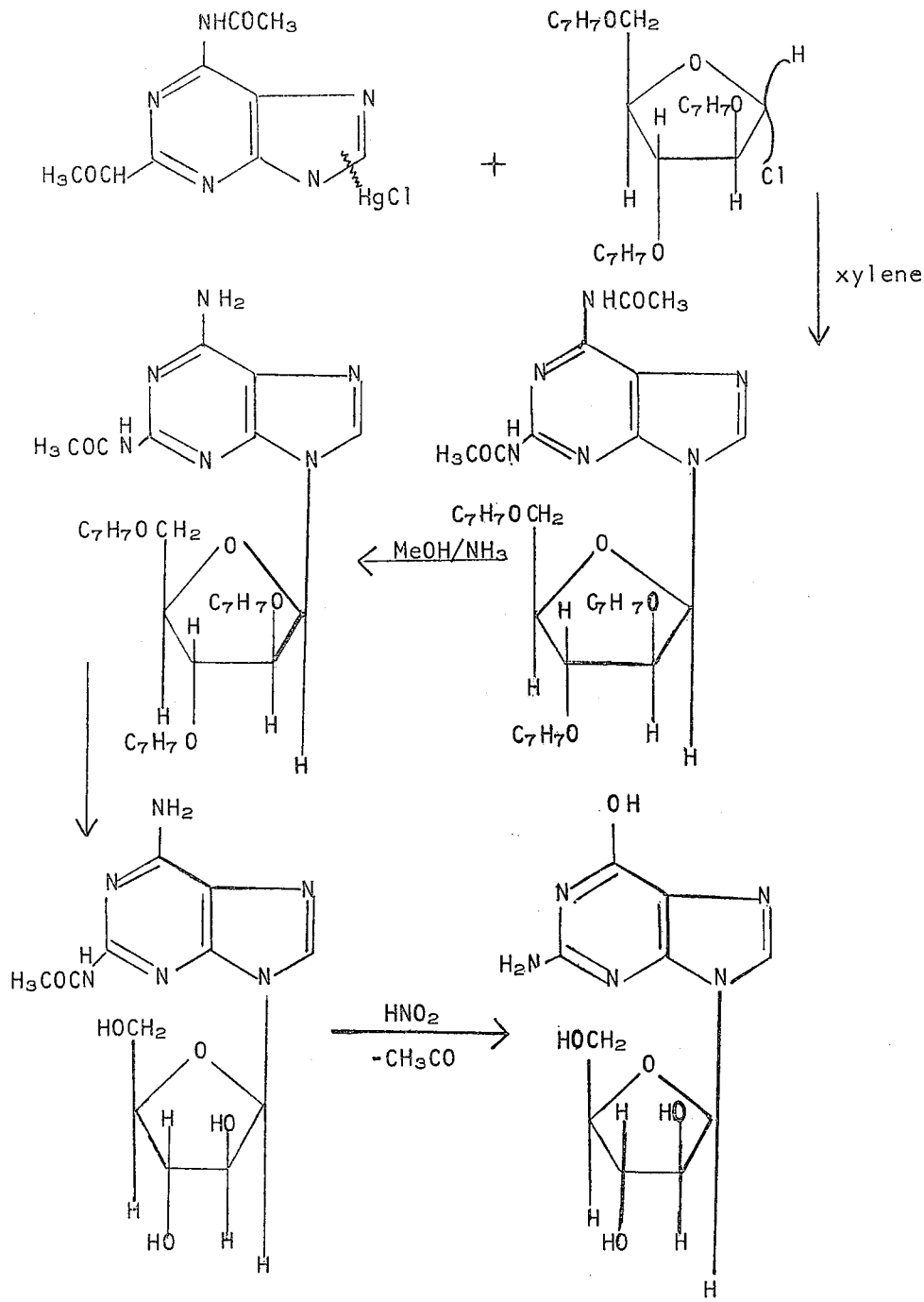

The group $C_7H_7O$ in the above formula designates the benzylozy group:

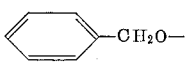

With mechanical stirring, a suspension of 5.15 g. (11.0 millimoles) of the chloromercury derivative of 2,6-diacetamidopurine [J. Davoll and B. A. Lowry, J. Am. Chem.

and exclusion of external moisture for 3 hours. The hot mixture was filtered through a bed of Celite (diatomaceous earth) and the filter bed washed with hot xylene. The pooled filtrate was concentrated in vacuo to a volume of ca. 100 ml., and the concentrate added to an excess of Skellysolve B with stirring. The resulting precipitate was collected, washed with Skellysolve B and dried in air. The crude solid was stirred with chloroform, the mixture filtered and the filter washed thoroughly with chloroform. The combined chloroform filtrate was washed three times with 30% aqueous potassium iodide solution, twice with water and the organic layer dried over anhydrous sodium sulfate. The solvent was removed in vacuo. The residue was swirled with methanol and the mixture evaporated to dryness in vacuo to afford 62% of a foamy solid of an anomeric mixture in which 9 - (2',3',5' - tri - O - benzyl - β - D - arabinofuranosyl)-2,6-diacetamido-purine was the major component.

A solution of 2.54 g. (4.0 millimoles) of the crude material in 100 ml. of methanol which had been saturated at 0° with dry ammonia was stored at 0° for about 16 hours. The solution was evaporated to dryness in vacuo and acetamide separated by sublimation under diminished pressure to yield 1.93 g. (81%) of amorphous solid consisting principally of the β-anomer of 9-(2',3',5'-tri - O - benzyl - D - arabinofuranosyl) - 2 - acetamido-6-aminopurine.

Hydrogenolysis of 2.97 g. (5.0 millimoles) of the crude monoacetamido derivative (above) essentially as described by Glaudemans and Fletcher [J. Org. Chem. 28, 3004 (1963)] for tri-O-benzyl-β-D-arabinofuranosyladenine followed by crystallization from water gave 1.44 g. (89%) of 9-β-D-arabinofuranosyl-2-acetamido-6-aminopurine.

A solution of 1.30 g. (4.0 millimoles) of the monoacetate above and 3.2 g. of sodium nitrite in 10 ml. of hot water was cooled to ambient temperature, 3.2 ml. of glacial acetic acid was added and the mixture stirred mechanically until solution was complete. Stirring was continued for approximately 1 hour, the solution diluted with an equal volume of water and stirred at room temperature for 16 hours. The pH of the solution was adjusted to 4 (pHydrion paper), and the solution concentrated in vacuo to dryness. The dry residue was stirred with hot methanol, the suspension filtered hot and the filter washed with hot methanol. To the combined methanolic filtrate (ca. 40 ml.) was added 460 mg. (2.0 milligram atoms) of sodium and the solution was refluxed for 1 hour. After neutralization with acetic acid, the solution was concentrated to a volume of 30.40 ml. and the resulting slurry was refrigerated at 5° for several hours. The crude product was collected, washed thoroughly with water, then crystallized twice from water in the presence of activated charcoal to give 6.77 mg. (60%) of 9-β-D-arabinofuranosyl-2-guanine as glistening needles.

Further treating 9-β-D-arabinofuranosylguanine with sodium nitrite and acetic acid gave 9-β-D-arabinofuranosylxanthine. In the same manner treatment of 9-β-D-arabinofuranosyladenine with sodium nitrite and acetic acid resulted in 9-β-D-arabinofuranosylhypoxanthine.

In the subsequent examples various ion exchange resins (Dow Co.) are utilized which can be described as follows:

*Dowex 50×8.*—Dowex 50×8 is a strongly acidic cation exchange resin composed of nuclear sulfonic acid exchange groups attached to a styrene polymer lattice cross-linked with approximately 8% divinylbenzene.

*Dowex 50W×8.*—Dowex 50W×8 is a specially purified form of Dowex 50×8 in which the resin has a *white* (W) color rather than the yellow-brown color of Dowex 50×8.0.

*Dowex 1×8.*—Dowex 1×8 is a strongly basic anion exchange resin of quaternary ammonium exchange groups attached to a styrene polymer lattice.

*Dowex AG 1×8.*—Dowex AG 1×8 is a specially purified and sized form of Dowex 1×8, supplied by Bio-Rod Laboratories, Richmond, California.

EXAMPLE 1

*1-(5'-O-triphenylmethyl-β-D-arabinofuranosyl) cytosine*

To a solution of 10 g. of 1-β-D-arabinofuranosylcytosine hydrochloride in 200 ml. of pyridine was added 12 g. of triphenylchloromethane. The reaction mixture was thereupon stirred at room temperature (23–26° C.) for 1 week. The reaction mixture was then poured with stirring into 3 l. of ice water whereupon 1-(5'-O-triphenylmethyl-β-D-arabinofuranosyl)cytosine separated as an oil. The oil solidified on standing with water overnight, and the solids were recovered by filtration, then broken up, washed thoroughly with water and air dried. The thus-obtained solids were triturated with 200 ml. of boiling heptane and the mixture filtered, collecting the insoluble material on a sintered glass funnel. The solids were again washed with 250 ml. portions of boiling heptane and, after having been dried, were transferred into 1 l. of boiling acetone containing 1 g. of active charcoal (Darco G 60). The hot suspension was filtered to remove the charcoal and the filtrate was distilled on a steam bath to a volume of about 75 ml. which was allowed to cool to room temperature, thereby giving a crystalline product. The crystalline product was collected on a sintered glass funnel and washed with one 25-ml. portion of acetone prior cooled on ice. The product was thereupon dried giving 13 g. of 1-(5'-O-triphenylmethyl-β-D-arabinofuranosyl) cytosine of melting point 227.5–228° C. with decomposition.

*Analysis.*—Calcd. for $C_{28}H_{27}N_3O_5$: C, 69.26; H, 5.61; N, 8.86. Found: C, 69.09; H, 5.67; N, 8.93.

In the same manner, 1'[5'-O-(p-methoxyphenyl)diphenylmethyl- or 1-[5'-O-bis(p-methoxyphenyl)phenylmethyl-1-D-arabinofuranosyl]-cytosine can be obtained by reacting cytosine arabinoside or its hydrochloride in pyridine solution with (p-methoxyphenyl)diphenylchloromethane or bis(p-methoxyphenyl)phenylchloromethane at a temperature between 0 and 60° under continuous stirring.

Similarly to Example 1, instead of triphenylchloromethane, triphenylbromomethane can be used to give the same final product 1-(5'-O-triphenylmethyl-β-D-arabinofuranosyl)cytosine.

EXAMPLE 2

*1-(5'-O-triphenylmethyl-β-D-arabinofuranosyl)uracil*

In the manner given in Example 1, 1-(β-D-arabinofuranosyl)uracil was reacted with triphenylchloromethane in pyridine to give 1-(5'-O-triphenylmethyl-β-D-arabinofuranosyl)uracil.

EXAMPLE 3

*1-(5'-O-triphenylmethyl-β-D-arabinofuranosyl)thymine*

In the manner given in Example 1, 1-(β-D-arabinofuranosyl)thymine was reacted with triphenylchloromethane in pyridine to give 1-(5'-O-triphenylmethyl-β-D-arabinofuranosyl)thymine.

EXAMPLE 4

*9-(5'-O-triphenylmethyl-β-D-arabinofuranosyl)adenine*

In the manner given in Example 1, 9-(β-D-arabinofuranosyl)adenine was reacted with triphenylbromomethane in pyridine to give 9-(5'-O-triphenylmethyl-β-D-arabinofuranosyl)adenine.

EXAMPLE 5

*9-[5'-O-(p-methoxyphenyl)diphenylmethyl-β-D-arabinofuranosyl]adenine*

In the manner given in Example 1, 9-(β-D-arabinofuranosyl)adenine was reacted with (p-methoxyphenyl)diphenylchloromethane in pyridine to give 9-[5'-O-(p-methoxyphenyl)diphenylmethyl - β - D-arabinofuranosyl]adenine.

EXAMPLE 6

*9-(5'-O-triphenylmethyl-β-D-arabinofuranosyl)(6-mercaptopurine)*

In the manner given in Example 1, 9-(β-D-arabinofuranosyl)-6-mercaptopurine was reacted with triphenylchloromethane in pyridine to give 9-(5'-O-triphenylmethyl-β-D-arabinofuranosyl)(6-mercaptopurine).

EXAMPLE 7

*1-(5'-O-triphenylmethyl-β-D-arabinofuranosyl) 5-chlorouracil*

In the manner given in Example 1, 1(β-D-arabinofuranosyl)5-chlorouracil was reacted with triphenylchloromethane in pyridine to give 1-(5'-O-triphenylmethyl-β-D-arabinofuranosyl)5-chlorouracil.

EXAMPLE 8

*1-(5'-O-triphenylmethyl-β-D-arabinofuranosyl) 5-fluorouracil*

In the manner given in Example 1, 1(β-D-arabinofuranosyl)5-fluorouracil was reacted with triphenylchloromethane in pyridine to give 1-(5'-O-triphenylmethyl-β-D-arabinofuranosyl)5-fluorouracil.

EXAMPLE 9

*1-(5'-O-triphenylmethyl-β-D-arabinofuranosyl) 5-trifluoromethyluracil*

In the manner given in Example 1, 1-(β-D-arabinofuranosyl)5-triflourmethyluracil was reacted with triphenylchloromethane in pyridine to give 1-(5'-O-triphenylmethyl-β-D-arabinofuranosyl)5-trifluoromethyluracil.

EXAMPLE 10

*1-(5'-O-triphenylmethyl-β-D-arabinofuranosyl) 5-bromouracil*

In the manner given in Example 1, 1-(β-D-arabinofuranosyl)5-bromouracil was reacted with triphenylchloromethane in pyridine to give 1-(5'-O-triphenylmethyl-β-D-arabinofuranosyl)5-bromouracil.

EXAMPLE 11

*1-(5'-O-triphenylmethyl-β-D-arabinofuranosyl) 5-iodouracil*

In the manner given in Example 1, 1-(β-D-arabinofuranosyl)5-iodouracil was reacted with triphenylchloromethane in pyridine to give 1-(5'-O-triphenylmethyl-β-D-arabinofuranosyl)5-iodouracil.

EXAMPLE 12

*9-(5'-O-triphenylmethyl-β-D-arabinofuranosyl)guanine*

In the manner given in Example 1, 9-(β-D-arabinofuranosyl)guanine was reacted with triphenylchloromethane in pyridine to give 9-(5'-O-triphenylmethyl-β-D-arabinofuranosyl)guanine.

EXAMPLE 13

*9-(5'-O-triphenylmethyl-β-D-arabinofuranosyl) hypoxanthine*

In the manner given in Example 1, 9-(β-D-arabinofuranosyl)-hypoxanthine was reacted with triphenylchloromethane in pyridine to give 9-(5'-O-triphenylmethyl-β-D-arabinofuranosyl)hypoxanthine.

EXAMPLE 14

*9-(5'-O-triphenylmethyl-β-D-arabinofuranosyl) xanthine*

In the manner given in Example 1, 9-(β-D-arabinofuranosyl)xanthine was reacted with triphenylbromomethane in pyridine to give 9-(5'-O-triphenylmethyl-β-D-arabinofuranosyl)xanthine.

EXAMPLE 15

*1-[5'-O-(p-methoxyphenyl)diphenylmethyl-β-D-arabinofuranosyl]5-methylcytosine*

In the manner given in Example 1, 1-(β-D-arabinofuranosyl)5-methylcytosine was reacted with (p-methoxyphenyl)diphenylchloromethane in pyridine to give 1-[5'-O-(p-methoxyphenyl)diphenylmethyl-β-D-arabinofuranosyl]5-methylcytosine.

EXAMPLE 16

*1-(5'-O-triphenylmethyl-β-D-arabinofuranosyl) 3-methylcytosine*

In the manner given in Example 1, 1-(β-D-arabinofuranosyl)3-methylcytosine was reacted with triphenylchloromethane in pyridine to give 1-(5'-O-triphenylmethyl-β-D-arabinofuranosyl)3-methylcytosine.

EXAMPLE 17

*9-(5'-O-triphenylmethyl-β-D-ribofuranosyl)adenine*

In the manner given in Example 1, 9-(β-D-ribofuranosyl)adenine was reacted with triphenylbromoethane in pyridine to give 9-(5'-O-triphenylmethyl-β-D-ribofuranosyl)adenine.

EXAMPLE 18

*1-[5'-O-(p-methoxyphenyl)diphenylmethyl-β-D-ribofuranosyl]5-methylcytosine*

In the manner given in Example 1, 1-(β-D-arabinofuranosyl)5-methylcytosine was reacted with (p-methoxyphenyl)diphenylchloromethane in pyridine to give 1-[5'-O-(p-methoxyphenyl)diphenylmethyl-β-D-ribofuranosyl]5-methylcytosine.

EXAMPLE 19

*1-(5'-O-triphenylmethyl-β-D-ribofuranosyl) 5-trifluoromethyluracil*

In the manner given in Example 1, 1-(β-D-ribofuranosyl)5-trifluoromethyluracil was reacted with triphenylchloromethane in pyridine to give 1-(5'-O-triphenylmethyl-β-D-ribofuranosyl)5-trifluoromethyluracil.

EXAMPLE 20

*1-(5'-O-triphenylmethyl-β-D-ribofuranosyl)cytosine*

In the manner given in Example 1, 1-(β-D-ribofuranosyl)cytosine was reacted with triphenylchloromethane in pyridine to give 1-(5'-O-triphenylmethyl-β-D-ribofuranosyl)cytosine.

EXAMPLE 21

*1-(5'-O-triphenylmethyl-β-D-ribofuranosyl) 3-methylcytosine*

In the manner given in Example 1, 1-(β-D-ribofuranosyl)3-methylcytosine was reacted with triphenylchloromethane in pyridine to give 1-(5'-O-triphenylmethyl-β-D-ribofuranosyl)3-methylcytosine.

EXAMPLE 22

*1-(5'-O-triphenylmethyl-β-D-deoxyribofuranosyl)uracil*

In the manner given in Example 1, 1-(β-D-deoxyribofuranosyl)uracil was reacted with triphenylchloromethane to give 1-(5'-O-triphenylmethyl-β-D-deoxyribofuranosyl)uracil.

EXAMPLE 23

*1-(5'-O-triphenylmethyl-β-D-deoxyribofuranosyl) cytosine*

In the manner given in Example 1, 1-(β-D-deoxyribofuranosyl)cytosine was reacted with triphenylchloromethane in pyridine to give 1-(5'-O-triphenylmethyl-β-D-deoxyribofuranosyl)cytosine.

EXAMPLE 24

*9-(5'-O-triphenylmethyl-β-D-deoxyribofuranosyl) adenine*

In the manner given in Example 1, 9-(β-D-deoxyribofuranosyl)adenine was reacted with triphenylbromoethane in pyridine to give 9-(5'-O-triphenylmethyl-β-D-deoxyribofuranosyl)adenine.

Example 25

*1-[5'-O-(p-methoxyphenyl)diphenylmethyl-β-D-deoxyribofuranosyl]5-iodouracil*

In the manner given in Example 1, 1-(β-D-deoxyribofuranosyl)5-iodouracil was reacted with (p-methoxyphenyl)diphenylchloromethane in pyridine to give 1-[5'-O - (p - methoxyphenyl)diphenylmethyl - β - D-deoxyribofuranosyl]5-iodouracil.

Example 26

*1-(5'-O-triphenylmethyl-β-D-deoxyribofuranosyl) 5-fluorouracil*

In the manner given in Example 1, 1-(β-D-deoxyribofuranosyl)5-fluorouracil was reacted with triphenylchloromethane in pyridine to give 1-(5'-O-triphenylmethyl-β-D-deoxyribofuranosyl)5-fluorouracil.

Example 27

*1-(5'-O-triphenylmethyl-β-D-deoxyribofuranosyl) thymine*

In the manner given in Example 1, 1-(β-D-deoxyribofuranosyl)thymine was reacted with triphenylchloromethane in pyridine to give 1-(5'-O-triphenylmethyl-β-D-deoxyribofuranosyl)thymine.

Example 28

*9-(5'-O-triphenylmethyl-β-D-deoxyribofuranosyl) guanine*

In the manner given in Example 1, 9-(β-D-deoxyribofuranosyl)guanine was reacted with triphenylbromomethane in pyridine to give 9-(5'-O-triphenylmethyl-β-D-deoxyribofuranosyl)guanine.

Example 29

*9-[5'-O-(p-methoxyphenyl)diphenylmethyl-β-D-deoxyribofuranosyl]xanthine*

In the manner given in Example 1, 9-(β-D-arabinofuranosyl)xanthine was reacted with (p-methoxyphenyl)diphenylchloromethane in pyridine to give 9-[5'-O-(p-methoxyphenyl)diphenylmethyl - β - D-arabinofuranosyl]xanthine.

Example 30

*9-[5'-O-(p-methoxyphenyl)diphenylmethyl-β-D-deoxyribofuranosyl]hypoxanthine*

In the manner given in Example 1, 9(β-D-deoxyribofuranosyl)-hypoxanthine was reacted with (p-methoxyphenyl)diphenylchloromethane in pyridine to give 9-[5'-O - (p - methoxyphenyl)diphenylmethyl-β-D-deoxyribofuranosyl]hypoxanthine.

In the same manner given in Example 1, other 1[5'-trityl-, 1-[5'-(p-methoxyphenyl)diphenylmethyl-, and 1-[5' - bis(p - methoxyphenyl)phenylmethyl-β-D-ribofuranose and deoxyribofuranose] N-heterocyclic compound can be prepared by reacting a compound selected from triphenylchloromethane, triphenylbromomethane, (p - methoxyphenyl)diphenylchloro(or bromo)methane and bis(p-methoxyphenyl)phenylchloro(or bromo)methane with a 1-[β-D-ribofuranosyl(deoxyribofuranosyl)N-heterocylic to give a compound of Formula II. Representative componds of Formula II thus produced include 9-(5'-O-triphenylmethyl-β-D-ribofuranosyl)guanine,
1-(5'-O-triphenylmethyl-β-D-ribofuranosyl)5-bromouracil,
1-(5'-O-triphenylmethyl-β-D-ribofuranosyl)5-iodouracil,
9-(5'-O-triphenylmethyl-β-D-ribofuranosyl)hypoxanthine,
9-(5'-O-triphenylmethyl-β-D-ribofuranosyl)xanthine,
9-(5'-O-triphenylmethyl-β-D-deoxyribofuranosyl) hypoxanthine,
1-(5'-O-triphenylmethyl-β-D-deoxyribofuranosyl) thymine,
1-(5'-O-triphenylmethyl-β-D-deoxyribofuranosyl)3-methylcytosine,
1-(5'-O-triphenylmethyl-β-D-deoxyribofuranosyl)5-methylcytosine,
1-(5'-O-triphenylmethyl-β-D-deoxyribofuranosyl)5-trifluoromethyluracil,
1-(5'-O-triphenylmethyl-β-D-deoxyribofuranosyl)5-bromouracil,
1-[5'-O-(p-methoxyphenyl)diphenylmethyl-β-D-deoxyribofuranosyl]5-chlorouracil,
9-[5'-O-triphenylmethyl-β-D-deoxyribofuranosyl]6-mercaptopurin,
1-[5'-O-bis(p-methoxyphenyl)phenylmethyl-β-D-deoxyribofuranosyl]3-methylcytosine,
1-[5'-O-bis(p-methoxyphenyl)phenylmethyl-β-D-deoxyribofuranosyl)5-methyluracil and the like.

Example 31

*$N^4$-benzoyl-1-(2',3'-di-O-benzoyl-β-D-arabinofuranosyl)-cytosine*

A mixture of 6.2 g. of 1-(5'-O-triphenylmethyl-β-D-arabinofurnanosyl)cytosine, 40 ml. of dry pyridine, and 6 ml. of benzoyl chloride was stirred at room temperature (24–26° C.) for about 20 hours. The thus-obtained reaction mixture was then poured into 500 ml. of cold water and stirred at room temperature for 3 hours. The aqueous portion was then decanted and the residual gummy material was washed twice with water by decantation. The gum and solids were dissolved in 150 ml. of methylene chloride and this solution was extracted consecutively twice with 50-ml. portions of water and once with 50 ml. of a saturated aqueous sodium chloride solution. The methylene solution was then dried by passing it through 10 g. of anhydrous sodium sulfate, supported on a sintered glass funnel. The drying agent was then washed with 20 ml. of methylene chloride and the washing combined with the filtrate. The methylene chloride solution was thereupon evaporated at 40° in vacuo. The thus-obtained residue was dissolved in 50 ml. of chloroform and treated with stirring with 6.7 ml. of hydrogen bromide in acetic acid solution (30% hydrogen bromide). After 3 minutes, the reaction mixture was distilled to a volume of about 10 ml. at 40° in vacuo, to give a concentrate. This concentrate was diluted with 10 ml. of ordinary chloroform and added to a chromatographic column made up with 100 g. of silica gel (180-ml. volume). The silica gel employed was Brinkman silicic acid for chromatography employing hydrocarbon stabilized chloroform. The column was thereupon eluted with 3 column volumes (540 ml.) of ethanol stabilized chloroform at a flow rate of about 3.5 ml. per minute. The effluent from this procedure was discarded. The column was thereupon eluted with 1.2 l. of ethanol stabilized with chloroform to which 3% by volume of methanol had been added at a flow rate of 3.5 ml. per minute. The effluent from this operation was collected in 20 ml. fractions. Each fraction was examined for the presence of triphenylcarbinol or triphenylether by placing a drop of each fraction on a sheet of chromatographic paper (Whatman No. 40) and examining the spot for ultraviolet absorption followed by spraying the paper with 50% aqueous sulfuric acid. Based on the result of this chromatographic determination, fractions 25–43 were combined, washed with 20 ml. of water containing 0.5 ml. of pyridine, dried with anhydrous sodium sulfate, and evaporated in vacuo to give a residue. This residue was recrystallized by dissolving it in ethyl acetate and adding Skellysolve B hexanes until crystallization started whereupon the vessel was refrigerated to 4° C. Three crops of crystals were collected which were all homogeneous as determined by thin layer chromatography using silica gel, 10% methanol and 90% benzene. The total yield in three crops was 1.45 g., 0.940 g. and 0.740 g., a total of 3.13 g. (44%) of $N^4$-benzoyl-1-(2',3'-di-O-benzoyl-β-D- arabinofuranosyl)-cytosine of melting point 177.5 to 178° C.

Analysis.—Calcd. for $C_{30}H_{25}O_8$, C, 64.9; H, 4.5; N, 7.57. Found: C, 63.95; H, 4.67; N, 7.29.

EXAMPLE 32

$N^4$-acetyl-1-(2',-3'-di-O-acetyl-5'-O-triphenylmethyl-β-D-arabinofuranosyl)cytosine A suspension of 750 mg. of 1-(5'-O-triphenylmethyl-β-D-arabinofuranosyl)cytosine in 9 ml. of pyridine was treated with 3 ml. of acetic anhydride with stirring until a uniform solution was obtained. Stirring was then continued for 2 hours whereupon the solution became a crystalline mass. This material was transferred into 90 ml. of water yielding a white crystalline material which was collected by filtration, the solids were washed thoroughly with water, and dried giving 950 mg. of crystals of melting point 249–259.5° C. This material was recrystallized from ethanol giving 800 mg. colorless rosettes of $N^4$-acetyl - 1 - (2',3' - di - O-acetyl-5'-O-triphenylmethyl-β-D-arabinofuranosyl)-cytosine of melting point 251–252° C.

Analysis.—Calcd. for $C_{34}H_{33}O_7N_3$: C, 66.76; H, 5.44; N, 6.87. Found: C, 67.04; H, 5.47; N, 7.00.

EXAMPLE 33

$N^4$-(β-cyclopentylpropionyl)-1-[2',3'-di-O-(β-cyclopentylpropionyl)-β-D-arabinofuranosyl]cytosine In the manner given in Example 31, 1-(5'-O-triphenylmethyl β-D-arabinofuranosyl)cytosine was reacted with β-cyclopentylpropionyl chloride in pyridine and subsequently treated with hydrogen bromide, dissolved in acetic acid, to give $N^4$-(β-cyclopentylpropionyl)-1-[2',3'-di-O-(β-cyclopentylpropionyl)-β-D-arabinofuranosyl]cytosine.

EXAMPLE 34

$N^4$-lauroyl-1-(2',3'-di-O-lauroyl-β-D-arabinofuranosyl)cytosine

In the manner given in Example 31, 1-(5'-O-triphenyl-methyl-β-D-arabinofuranosyl)cytosine was reacted with lauroyl chloride in pyridine and subsequently treated with hydrogen bromide, dissolved in acetic acid, to give $N^4$-lauroyl - 1 - (2',3' - di - O-lauroyl-β-D-arabinofuranosyl) cytosine.

EXAMPLE 35

$N^4$-propionyl-1-(2',3'-di-O-propionyl-5'-triphenyl-methyl-β-D-arabinofuranosyl)cytosine In the manner given in Example 32, 1-(5'-O-triphenyl-methyl-β-D-arabinofuranosyl)cytosine was reacted with propionic anhydride in pyridine to give $N^4$-propionyl-1-(2',3'-di-O-propionyl-5'-triphenylmethyl-β-D - arabinofuranosyl) cytosine.

EXAMPLE 36

$N^4$-butyryl-9-(2',3'-di-O-butyryl-5'-O-triphenylmethyl-β-D-arabinofuranosyl)adenine In the manner given in Example 32, 9-(5'-O-triphenyl-methyl-β-D-arabinofuranosyl) adenine was reacted with butyric anhydride in pyridine to give $N^6$-butyryl-9-(2',3'-di - O - butyryl - 5' - O - triphenylmethyl - β - D - arabinofuranosyl)adenine.

EXAMPLE 37

1-(2',3'-di-O-phenylacetyl-5-O-triphenylmethyl-β-D-arabinofuranosyl)thymine

In the manner given in Example 32, 1-(5'-O-triphenyl-methy-β-D-arabinofuranosyl) thymine was reacted with phenylacetic anhydride in pyridine to give 1-(2',3'-di-O-diphenylacetyl - 5' - O - triphenylmethyl-β-D-arabinofuranosyl)thymine.

EXAMPLE 38

1-(2',3'-di-O-hexanoyl-5'-O-triphenylmethyl-β-D-arabinofuranosyl)uracil

In the manner given in Example 32, 1-(5'-O-triphenylmethyl-β-D-arabinofuranosyl) uracil was reacted with hexanoic anhydride in pyridine to give 1-(2',3'-di-O-hexanoyl-5'-O-triphenylmethyl-β-D-arabinofuranosyl) uracil.

EXAMPLE 39

9-(2',3'-di-O-phenylpropionyl-5'-O-triphenylmethyl-β-D-arabinofuranosyl)xanthine In the manner given in Example 32, 9-(5'-O-triphenylmethyl-β-D-arabinofuranosyl)xanthine was reacted with phenylpropionic anhydride in pyridine to give 9-(2',3'-di-O-phenylpropionyl-5'-O-triphenylmethyl-β-D - arabinofuranosyl)xanthine.

EXAMPLE 40

1-(2',3'-di-O-benzoyl-β-D-arabinofuranosyl) β-D-arabinofuranosyl)guanine

In the manner given in Example 31, 1-(5'-O-triphenyl-methyl-β-D-arabinofuranosyl)5-chlorouracil was reacted with benzoyl chloride and the resulting product was then reacted with a solution of hydrogen bromide in acetic acid to give 1-(2',3'-di-O-benzoyl-β-D-arabinofuranosyl) 5-chlorouracil.

EXAMPLE 41

$N^2$-benzoyl-9-(2',3'-di-O-benzoyl-β-D-arabinofuranosyl)-guanine

In the manner given in Example 31, 9-(5'-O-triphenyl-methyl-β-D-arabinofuranosyl)guanine was reacted with benzoyl chloride and the resulting product was then reacted with a solution of hydrogen bromide in acetic acid to give $N^2$-benzoyl-9-(2',3'-di-O-benzoyl-β-D-arabinofuranosyl)guanine.

EXAMPLE 42

9-(2',3'-di-O-benzoyl-β-D-arabinofuranosyl) 6-mercaptopurine

In the manner given in Example 31, 9-(5'-O-triphenyl-methyl-β-D-arabinofuranosyl)6-mercaptopurine was reacted with benzoyl chloride and the resulting product was then reacted with a solution of hydrogen bromide in acetic acid to give 9-(2',3'-di-O-benzoyl-β-D-arabinofuranosyl) 6-mercaptopurine.

EXAMPLE 43

9-(2',3'-di-O-acetyl-5'-O-triphenylmethyl-β-D-arabinofuranosyl)xanthine

In the manner given in Example 32, 9-(5'-O-triphenyl methyl-β-D-arabinofuranosyl)uracil was reacted with acidic anhydride to give 9-(2',3'-di-O-acetyl-5'-O-triphenylmethyl-β-D-arabinofuranosyl)xanthine.

EXAMPLE 44

1-(2',3'-di-O-phenylacetyl-5'-O-triphenylmethyl-β-D-arabinofuranosyl)5-fluorouracil In the manner given in Example 32, 1-(5'-O-triphenyl-methyl-β-D-arabinofuranosyl)5-fluorouracil was reacted with phenylacetic anhydride to give 1-(2',3'-di-O-phenyl-acetyl-5'-triphenylmethyl-β-D-arabinofuranosyl)5 - fluorouracil.

EXAMPLE 45

$N^4$-valeryl-9-(2',3'-di-O-valeryl-5'-O-triphenylmethyl-β-D-arabinofuranosyl)5-methylcytosine In the manner given in Example 32, 9-(5'-O-triphenyl-methyl-β-D-arabinofuranosyl)5-methylcytosine was reacted with valeric anhydride to give $N^4$-valeryl-9-(2',3'-di-O-valeryl-5'-O-triphenylmethyl - β-D-arabinofuranosyl)5-methylcytosine.

EXAMPLE 46

*1-(2',3'-di-O-benzoyl-β-D-ribofuranosyl)uracil*

In the manner given in Example 31, 1-(5'-O-triphenylmethyl-β-D-ribofuranosyl)uracil was reacted with benzoyl chloride and the resulting product was then reacted with a solution of hydrogen bromide in acetic acid to give 1-(2',3'-di-O-benzoyl-β-D-ribofuranosyl)uracil.

EXAMPLE 47

*$N^4$-benzoyl-1-(2',3'-di-O-benzoyl-β-D-ribofuranosyl)cytosine*

In the manner given in Example 31, 1-(5'-O-triphenylmethyl-β-D-ribofuranosyl)cytosine was reacted with benzoyl chloride and the resulting product was then reacted with a solution or hydrogen bromide in acetic acid to give $N^4$-benzoyl - 1 - (2',3'-di-O-benzoyl-β-D-ribofuranosyl) cytosine.

EXAMPLE 48

*1-(2',3'-di-O-benzoyl-β-D-ribofuranosyl)thymine*

In the manner given in Example 31, 1-(5'-O-triphenylmethyl-β-D-ribofuranosyl)thymine was reacted with benzoyl chloride and the resulting product was then reacted with a solution of hydrogen bromide in acetic acid to give 1-(2',3'-di-O-benzoyl-β-D-ribofuranosyl)thymine.

EXAMPLE 49

*1-(2',3'-di-O-lauroyl-β-D-ribofuranosyl)5-fluorouracil*

In the manner given in Example 31, 1-(5'-O-triphenylmethyl-β-D-ribofuranosyl)5-fluorouracil was reacted with lauroyl chloride and the resulting product was then reacted with a solution of hydrogen bromide in acetic acid to give 1-(2',3'-di-O-lauroyl-β-D-ribofuranosyl)-5-fluorouracil.

EXAMPLE 50

*$N^6$-decanoyl-9-(2',3'-di-O-decanoyl-β-ribofuranosyl)adenine*

In the manner given in Example 31, 9-(5'-O-triphenylmethyl-β-D-ribofuranosyl)adenine was reacted with decanoyl chloride and the resulting product was then reacted with a solution of hydrogen bromide in acetic acid to give $N^6$-decanoyl-9-(2',3'-di-O-decanoyl-β-D - ribofuranosyl) adenine.

EXAMPLE 51

*9-(2',3'-di-O-octanoyl-β-D-ribofuranosyl)6-mercaptopurine*

In the manner given in Example 31, 9-(5'-O-triphenylmethyl-β-D-ribofuranosyl)6-mercaptopurine was reacted with octanoyl chloride and the resulting product was then reacted with a solution of hydrogen bromide in acetic acid to give 9-(2',3'-di-O-octanoyl-β-D-ribofuranosyl)6 - mercaptopurine.

EXAMPLE 52

*1-(3'-O-benzoyl-β-D-deoxyribofuranosyl)uracil*

In the manner given in Example 31, 1-(5'-O-triphenylmethyl-β-O-deoxyribofuranosyl)uracil was reacted with benzoyl chloride and the resulting product was then reacted with a solution of hydrogen bromide in acetic acid to give 1-(3'-O-benzoyl-β-D-deoxyribofuranosyl)uracil.

EXAMPLE 53

*$N^4$-benzoyl-1-(3'-O-benzoyl-β-D-deoxyribofuranosyl)cytosine*

In the manner given in Example 31, 1-(5'-O-triphenylmethyl-β-D-deoxyribofuranosyl)cytosine was reacted with benzoyl chloride and the resulting product was then reacted with a solution of hydrogen bromide in acetic acid to give $N^4$-benzoyl-1-(3'-O-benzoyl - β - D - deoxyribofuranosyl)cytosine.

EXAMPLE 54

*1-(3'-O-benzoyl-β-D-deoxyribofuranosyl)5-fluorouracil*

In the manner given in Example 31, 1-(5'-O-triphenylmethyl-β-D-deoxyribofuranosyl)5-fluorouracil was reacted with benzoyl chloride and the resulting product was then reacted with a solution of hydrogen bromide in acetic acid to give 1-(3'-O-benzoyl-β-D - deoxyribofuranosyl)5-fluorouracil.

EXAMPLE 55

*$N^4$-acetyl-1-(3'-O-acetyl-β-D-deoxyribofuranosyl)5-methylcytosine*

In the manner given in Example 31, 1-(5'-O-triphenylmethyl-β-D-deoxyribofuranosyl)5-methylcytosine was reacted with benzoyl chloride and the resulting product was then reacted with a solution of hydrogen bromide in acetic acid to give $N^4$-acetyl-1-(3'-O-acetyl - β - D - deoxyribofuranosyl)5-methylcytosine.

EXAMPLE 56

*9-(3'-O-benzoyl-β-D-deoxyribofuranosyl)6-mercaptopurine*

In the manner given in Example 31, 9-(5'-O-triphenylmethyl-β-D-deoxyribofuranosyl)6-mercaptopurine was reacted with benzoyl chloride and the resulting product was then reacted with a solution of hydrogen bromide in acetic acid to give 9-(3'-O-benzoyl-β-D-deoxyribofuranosyl)6-mercaptopurine.

EXAMPLE 57

*1-(2',3'-di-O-acetyl-5'-triphenylmethyl-β-D-ribofuranosyl)uracil*

In the manner given in Example 32, 1-(5'-O-triphenylmethyl-β-D-ribofuranosyl)uracil was reacted with acetic anhydride to give 1-(2',3'-di-O-acetyl-5'-triphenylmethyl-β-D-ribofuranosyl)uracil.

EXAMPLE 58

*1-(2',3'-di-O-acetyl-5'-triphenylmethyl-β-D-ribofuranosyl)5-fluorouracil*

In the manner given in Example 32, 1-(5'-O-triphenylmethyl-β-D-ribofuranosyl)5-fluorouracil was reacted with acetic anhydride to give 1-(2',3'-di-O-acetyl-5'-triphenylmethyl-β-D-ribofuranosyl)5-fluorouracil.

EXAMPLE 59

*9-(2',3'-di-O-propionyl-5'-triphenylmethyl-β-D-ribofuranosyl)6-mercaptopurine*

In the manner given in Example 32, 9-(5'-O-triphenylmethyl-β-D-ribofuranosyl)6-mercaptopurine was reacted with acetic anhydride to give 9-(2',3'-di-O-propionyl-5'-trpihenylmethyl-β-D-ribofuranosyl)6-mercaptopurine.

In the manner given in Example 31, other acyl compounds of Formula IV can be produced by reacting a compound of Formula II with an acid anhydride, acyl chloride or acyl bromide wherein the acyl groups are of a hydrocarbon carboxylic acid containing from 2 to 12 carbon atoms, inclusive, and anisic acid; and cleaving the 5'-ether group with hydrogen halide, particularly hydrogen bromide or iodide, compounds thus obtained include:

$N^4$-lauroyl-9-(2',3'-di-O-lauroyl-β-D-arabinofuranosyl) adenine,
9-(2',3'-di-O-valeryl-β-D-ribofuranosyl)hypoxanthine,
9-(2',3'-di-O-hexanoyl-β-D-ribofuranosyl)xanthine,
3-(2',3'-di-O-octanoyl-β-D-ribofuranosyl)3-uracil,
9-(2',3'-di-O-isobutyryl-β-D-ribofuranosyl)5-fluorouracil,
1-(2',3'-di-O-anisoyl-β-D-ribofuranosyl)thymine,
$N^4$-phenylacetyl-1-(2',3'-di-O-phenylacetyl-β-D-ribofuranosyl)3-methylcytosine,
1-(3'-O-butyryl-β-D-deoxyribofuranosyl)5-iodouracil,
1-(3'-O-undecanoyl-β-D-deoxyribofuranosyl)5-trifluoromethyluracil, 1-(3'-O-decanoyl-β-D-deoxyribofuranosyl)5-bromouracil,
9-(3'-O-heptanoyl-β-D-deoxyribofuranosyl)guanine,
9-(3'-O-nonanoyl-β-D-deoxyribofuranosyl)6-mercaptopurine,
9-(3'-O-octanoyl-β-D-deoxyribofuranosyl)xanthine,
and the like.

EXAMPLE 60

*1-(3'-O-propionyl-5'-triphenylmethyl-β-D-deoxyribofuranosyl)uracil*

In the manner given in Example 32, 1-(5'-O-triphenylmethyl-β-D-deoxyribofuranosyl)uracil was reacted with propionic anhydride to give 1-(3'-O-propionyl - 5' - triphenylmethyl-β-D-deoxyribofuranosyl)uracil.

EXAMPLE 61

*1-(3'-O-butyryl-5'-triphenylmethyl-β-D-deoxyribofuranosyl)5-fluorouracil*

In the manner given in Example 32, 1-5'-O-triphenylmethyl-β-D-deoxyribofuranosyl)5-fluorouracil was reacted with butyric anhydride to give 1-3'-O-butyryl-5' - triphenylmethyl-β-D-deoxyribofuranosyl)5-fluorouracil.

EXAMPLE 62

$N^4$-acetyl-1-(2',3'-di-O-acetyl - β - D - arabinofuranosyl)cytosine and 1-(2',3',-di-O-acetyl-β - D - arabinofuranosyl)cytosine A suspension of 10 ml. of 80% aqueous acetic acid and 1.3 g. of $N^4$-acetyl-1-(2',3'-di-O-acetyl-5'-O - triphenylmethyl-β-D-arabinofuranosyl)cytosine was heated to reflux for 10 minutes. The suspension was then refrigerated, filtered free of triphenylcarbinol and evaporated in vacuo at a temperature between 30–40° C. The product was taken up with 20 ml. of methanol and poured on a column containing a volume of 200 ml. of silica gel. The column was then eluted with thirty 20-ml. fractions consisting of methanol (25%), benzene (75%). Fractions 5–11 were combined and recrystallized from acetone-Skellysolve B hexanes to give 240 mg. melting at 171–172.5° C. This product was recrystallized to give $N^4$-acetyl-1-(2',3'-di-O-acetyl-β-D - arabinofuranosyl)cytosine of melting point 174.5 to 175.5° C. and the following analysis:

*Analysis.*—Calcd. for $C_{15}H_{19}O_8N_3$: C, 48.78; H, 5.19; N, 11.66. Found: C, 48.79; H, 4.81; N, 11.66.

Fractions 26 to 29 contained a small amount of 1-(2',3'-di-O-acetyl-β-D-arabinofuranosyl)cytosine.

EXAMPLE 63

$N^4$-anisoyl-1-(2',3'-di-O-benzoyl-β-D-arabinofuranosyl)cytosine

A. $N^4$-anisoyl-1-β-D-arabinofuranosylcytosine.—5 g. of 1-β-D-arabinofuranosylcytosine and 25 ml. of anisoyl chloride were dissolved in 100 ml. of pyridine and the solution stirred at about 25° for 6 hours. To this mixture was added 400 ml. of 1.5 N hydrochloric acid and the thus-obtained solution was allowed to stand overnight at room temperature between 22–24° C. The solids were then filtered, washed and ground thoroughly with water and air-dried. They were thereupon suspended in a mixture consisting of 275 ml. of water and 251 ml. of ethanol which mixture was warmed to 70° C. on a steam bath. The crude suspension was then chilled to 4° and the pH adjusted to 8 by adding 1 N sodium hydroxide solution. The solids were immediately recovered by filtration, washed with water, air-dried, and then washed with 300 ml. of ether, filtered and air-dried to give 16.6 g. of crude $N^6$-anisoyl-1 - β-D-arabinofuranosylcytosine. This crude product was taken up with 195 ml. of pyridine and 65 ml. of water and chilled to ice temperature. The solution was then treated with vigorous stirring with 350 ml. of 1.5 N sodium hydroxide for one-half hour. The reaction was then terminated by the addition of 350 ml. of Dowex 50×8 (50–100 mesh) pyridinium resin followed by stirring for 20 minutes (pH 7.0). The solution was filtered free of insoluble material and the resulting residue was washed with water. The combined filtrates were taken to dryness in vacuo at 50° C. and the residue stirred with three 200 ml. portions of ether and filtered. The solid was then suspended in 300 ml. of boiling water and filtered 3 times. The combined filtrates were evaporated to a small volume under reduced pressure giving 2.0 g. of product, of melting point 197–200° C. (decomposition). This crude material was recrystallized 4 times from water, once from ethanol, to give $N^4$-anisoyl-1-β-D-arabinofuranosylcytosine of melting point 200.5 to 201.5° with decomposition.

*Analysis.*—Calcd. for $C_{17}H_{19}O_7N_3$: C, 54.11; H, 5.08; N, 11.14. Found: C, 54.38; H, 4.82; N, 11.31.

B. $N^4$-anisoyl-1-[5'-O-(p-methoxyphenyl)diphenylmethyl-β-D-arabinofuranosyl]cytosine.—A solution of 4.8 g. of $N^4$-anisoyl-1-β-D-arabinofuranosylcytosine in 50 ml. of pyridine was treated with (p-methoxyphenyl)-diphenylchloromethane. After 9 hours, 10 ml. of methanol was added and the pyridine solution poured into 600 ml. of water under stirring. When the gum had coagulated, the solution was decanted, the gum was washed several times with water by decantation and then taken up in methylene chloride, washed with water twice and once with saturated sodium chloride solution. The solution was then dried over anhydrous sodium sulfate and evaporated to dryness at 30° in vacuo, to give a residue. This residue was dissolved in benzene and thereupon absorbed on a column of silica gel (5.8 x 48 cm.) and the column was then eluted as follows: twenty 100-ml. fractions of 2% methanol, 98% benzene and then 40 fractions of 100 ml. of 5% methanol, 95% benzene. Fractions 49–60 were triturated with ether, giving a crystalline solid which was collected and washed with ether, providing 4.21 g. of crude $N^4$-anisoyl-1-[5' - O - (p-methoxyphenyl)diphenylmethyl-β-D-arabinofuranosyl]cytosine.

C. $N^4$-anisoyl-1-(2',3' - di-O-benzoyl-β-D-arabinofuranosyl)cytosine.—4 g. of $N^4$-anisoyl-1-[5'-O-(p-methoxyphenyl)diphenylmethyl-β-D - arabinofuranosyl]cytosine in 20 ml. of dry pyridine was treated with 3 ml. of benzoyl chloride. The sealed vessel containing the reaction mixture was allowed to stand for 18 hours at room temperature, the reaction mixture was thereupon poured into ice water, stirred for 3 hours at about 25° C. whereby a gummy solid precipitated. This crude product was extracted with two 50-ml. portions of methylene chloride, the extracts were combined, washed five times with water, one time with saturated aqueous sodium sulfate and evaporated to dryness in vacuo. The residues were codistilled with toluene at reduced pressure to eliminate residual pyridine and the thus-obtained residue was taken up in 50 ml. of dioxane and treated with 80% acetic acid. To this solution was added enough hydrochloric acid to produce a 0.03 N solution. The mixture was then allowed to stand for a period of 5 hours. The solvents were removed in vacuo at 40° and the residue was treated with 100 ml. of a 1/1 chloroform-ethanol mixture which was then reevaporated. The thus-obtained residue was taken up in chloroform and absorbed on a column of silica gel (2.8 cm. diameter, 40 cm. high having a 250-ml. column volume). The column was then eluted with four 250-ml. fractions of chloroform containing .75% ethanol followed by six 250-ml. fractions of chloroform containing an additional 3% of methanol. Fractions 5–8 were combined and absorbed on a silica gel column (2.8 cm. x 50 cm.). This column was then eluted with 4 column volumes of ordinary chloroform followed by 2 1. of 3% methanol in chloroform solution which were collected in fractions of 20 ml. each at a column rate of 5 ml. per minute. Fractions 46–54 (220 ml.) contained the desired material which when recrystallized from ethyl acetate-Skellysolve B hexanes had a melting point of 172–173° C. This material was pure $N^4$-anisoyl-1-(2',3'-di-O-benzoyl-β-D-arabinofuranosyl)cytosine.

*Analysis.*—Calcd. for $C_{31}H_{27}N_3O_9$: N, 7.18. Found: N, 7.23.

In the manner given in Example 32, other acylated and 5'-etherated compounds of Formula III can be prepared by reacting a compound of Formula II with an acylating reagent selected from acyl halide and acid anhydrides, wherein the acyl group is of a hydrocarbon carboxylic acid containing from 2 to 12 carbon atoms, inclusive, and anisic acid. Representative compounds thus obtained include:

1-(2',3'-di-O-heptanoyl-5'-O-triphenylmethyl-β-D-ribofuranosoyl)5-iodouracil,
$N^4$-phenylacetyl-1-(2',3'-di-O-phenylacetyl-5'-O-triphenylmethyl-β-D-arabinofuranosyl)cytosine,
$N^4$-hexanoyl-1-(2',3',di-O-hexanoyl-5'-O-triphenylmethyl-β-D-arabinofuranosyl)cytosine,
$N^4$-phenylpropionyl-1-(2',3'-di-O-phenylpropionyl-5'-O-triphenylmethyl-β-D-arabinofuranosyl)cytosine,
$N^4$-butyryl-1-(2',3'-di-O-butyryl-5'-O-triphenylmethyl-β-D-arabinofuranosyl)cytosine,
$N^4$-valeryl-1-(2',3'-di-O-valeryl-5'-O-triphenylmethyl-β-D-arabinofuranosyl)cytosine,
$N^4$-hexanoyl-1-(2',3'-di-O-hexanoyl-5'-O-triphenylmethyl-β-D-arabinofuranosyl)cytosine,
$N^4$-heptanoyl-1-(2',3'-di-O-heptanoyl-5'-O-triphenylmethyl-β-D-arabinofuranosyl)cytosine,
$N^4$-octanoyl-1-(2',3'-di-O-octanoyl-5'-O-triphenylmethyl-β-D-arabinofuranosyl)cytosine,
$N^4$-acetyl-1-[2',3'-di-O-acetyl-5'-O-(p-methoxyphenyl)diphenylmethyl-β-D-arabinofuranosyl]cytosine,
$N^4$-acetyl-1-[2',3'-di-O-acetyl-5'-O-bis(p-methoxyphenyl)phenylmethyl-β-D-arabinofuranosyl]cytosine,
$N^4$-phenylpropionyl-1-[2',3'-di-O-phenylpropionyl-5'-O-(p-methoxyphenyl) diphenylmethyl-β-D-arabinofuranosyl]cytosine,
$N^4$-valeryl-1-(2',3'-di-O-valeryl-5'-O-triphenylmethyl-β-D-ribofuranosyl)cytosine,
1-(2',3'-di-O-hexanoyl-5'-O-triphenylmethyl-β-D-arabinofuranosyl)uracil,
9-(2',3'-di-O-heptanoyl-5'-O-triphenylmethyl-β-D-deoxyribofuranosyl)xanthine,
1-(2',3'-di-O-octanoyl-5'-O-triphenylmethyl-β-D-arabinofuranosyl)guanine,
$N^6$-acetyl-1-[2',3'-di-O-acetyl-5'-O-(p-methoxyphenyl)diphenylmethyl-β-D-deoxyribofuranosyl]adenine,
$N^4$-acetyl-1-[2',3'-di-O-acetyl-5'-O-bis-(p-methoxyphenyl)phenylmethyl-β-D-deoxyribofuranosyl)3-methylcytosine,
1-[2',3'-di-O-phenylpropionyl-5'-O-(p-methoxyphenyl)diphenylmethyl-β-D-ribofuranosyl)5-chlorouracil,
$N^4$-valeryl-1-(2',3'-di-O-valeryl-5'-O-triphenylmethyl-β-D-arabinofuranosyl)3-methylcytosine,
$N^4$-hexanoyl-1-(2',3'-di-O-hexanoyl-5'-O-triphenylmethyl-β-D-ribofuranosyl)5-methylcytosine,
9-(2',3'-di-O-heptanoyl-5'-O-triphenylmethyl-β-D-deoxyribofuranosyl)hypoxanthine,
1-(2'3'-di-O-octanoyl-5'-O-triphenylmethyl-β-D-arabinofuranosyl)5'-trifluoromethyluracil,
$N^2$-acetyl-9-[2',3'-di-O-diacetyl-5'-O-(p-methoxyphenyl) diphenylmethyl-β-D-ribofuranosyl]guanine,
$N^6$-acetyl(2',3'-di-O-acetyl-5'-O-bis(p-methoxyphenyl)phenylmethyl-β-D-arabinofuranosyl]adenine,
$N^4$-anisoyl-1-[2',3'-di-O-anisoyl-5'-O-(p-methoxyphenyl)diphenylmethyl-β-D-deoxyribofuranosyl]5-methylcytosine, and the like.

EXAMPLE 64

$N^4$-*butylyl-1-(2',3'-di-O-butyryl-β-D-arabinofuranosyl) cytosine*

In the manner given in Example 62, $N^4$-butyryl-1-(2',3'-di - O - butyryl - 5' - O - triphenylmethyl - β - D - arabinofuranosyl)cytosine is heated with aqueous acetic acid to give $N^4$ - butyryl - 1 - (2',3' - di - O - butyryl - β - D-arabinofuranosyl)cytosine.

EXAMPLE 65

$N^4$-*phenylacetyl-1-(2',3'-di-O-phenylacetyl-β-D-arabinofuranosyl) cytosine*

In the manner given in Example 62, $N^4$-phenylacetyl-1-(2',3' - di - O - phenylacetyl - 5' - O - triphenylmethyl-β-D-arabinofuranosyl)cytosine is heated with aqueous acetic acid to give $N^4$-phenylacetyl-1-(2',3'-di-O-phenylacetyl-β-D-arabinofuranosyl)cytosine.

EXAMPLE 66

$N^4$-*hexanoyl-1-(2',3'-di-O-hexanoyl-β-D-arabinofuranosyl) cytosine*

In the manner given in Example 62, $N^4$-hexanoyl-1-(2',3' - di - O - hexanoyl - 5' - O - triphenylmethyl - β - D-arabinofuranosyl)cytosine is heated with aqueous acetic acid to give $N^4$-hexanoyl-1-(2',3'-di-O-hexanoyl-β-D-arabinofuranosyl)cytosine.

EXAMPLE 67

$N^4$-*phenylpropionyl-1-(2',3'-di-O-phenylpropionyl-β-D-arabinofuranosyl) cytosine*

In the manner given in Example 62, $N^4$-phenylpropionyl - 1 - (2',3' - di - O - phenylpropionyl - 5' - O-triphenylmethyl-β-D-arabinofuranosyl)cytosine is heated with aqueous acid to give $N^4$-phenylpropionyl-1-(2',3'-di-O-phenylpropionyl-β-D-arabinofuranosyl)cytosine.

In the same manner given in Example 62, other N-acyl - 1 - (2',3' - di - O - acyl - β - D - arabinofuranosyl) cytosines are obtained by heating the corresponding $N^4$-acyl - 1 - (2',3' - di - O - acyl - 5' - O - triphenylmethyl-β-D-arabinofuranosyl)cytosines with aqueous acetic acid. Representative compounds thus obtained include:

$N^4$-valeryl-1-(2',3'-di-O-valeryl-β-D-arabinofuranosyl)cytosine,
$N^2$-hexanoyl-1-(2',3'-di-O-hexanoyl-β-D-arabinofuranosyl)guanine,
$N^6$-heptanoyl-1-(2',3'-di-O-heptanoyl-β-D-arabinofuranosyl)adenine,
$N^4$-octanoyl-1-(2',3'-di-O-octanoyl-β-D-arabinofuranosyl)3-methylcytosine,
$N^4$-benzoyl-1-(2',3'-di-O-benzoyl-β-D-arabinofuranosyl)cytosine,
$N^6$-anisoyl-9-(2',3'-di-O-anisoyl-β-D-arabinofuranosyl)adenine,
9-(2',3'-di-O-lauroyl-β-D-ribofuranosyl)xanthine,
$N^4$-octanoyl-1-(2,3'-di-O-octanoyl-β-D-arabinofuranosyl)3-methylcytosine,
$N^2$-decanoyl-9(2',3'-di-O-decanoyl-β-D-aribofuranosyl)guanine,
$N^4$-butyryl-1-(2',3'-di-O-butyryl-β-D-arabinofuranosyl)5-methylcytosine,
9-(2',3'-di-O-phenylpropionyl-β-D-ribofuranosyl)6-mercaptopurine,
$N^4$-propionyl-1-(2',3'-di-O-propionyl-β-D-arabinofuranosyl)5-methylcytosine,
1-[2',3'-di-O-(β-cyclopentylpropionyl)-β-D-ribofuranosyl]5-iodouracil,
1-(2',3'-di-O-anisoyl-β-D-ribofuranosyl)-5-fluorouracil,
1-(3'-O-valeryl-β-D-deoxyribofuranosyl)uracil,
1-(2',3'-di-O-benzoyl-β-D-ribofuranosyl)5-trifluoromethyluracil,
1-(3'-O-hexanoyl-β-D-deoxyribofuranosyl)thymine, and the like.

EXAMPLE 68

1-β-D-*arabinofuranosylcytosine 5'-phosphate*

To a solution of 40 ml. of pyridine, 0.325 M in 2-cyanoethyl phosphate was added 2.5 g. of $N^4$-acetyl-1-(2',3'-di-O-acetyl-β-D-arabinofuranosyl)cytosine containing a small amount of 1-(2',3'-di-O-acetyl-β-D-arabinofuranosyl)cytosine. To this solution was added an additional 20 ml. of pyridine containing 5.6 g. of dicyclohexylcarbodiimide. The reaction mixture was shaken in the dark for 2 days after which time 10 ml. of water was added and the solution warmed up to 40° C. The reaction mixture was shaken for one hour after which time an additional 75 ml. of water was added and the solution was filtered free of insoluble dicyclohexylurea. The filtrate was taken to dryness, diluted with 50 ml. of water and again evaporated to remove residual pyridine. The thus-obtained residue was then partitioned between water and ether, 150 ml. (1:1) and the aqueous portion freed of ether in vacuo after a second extraction. The remaining aqueous solution (90 ml.) was then treated with 2.16 g. (90 mmoles) of lithium hydroxide and the solution heated to 100° C. for a period of 1 hour. Thereafter the suspension was chilled and filtered free of lithium phosphate. The solids were washed with 0.01 N lithium hydroxide solution which was added to the filtrate. The filtrate was then adjusted to a pH of 7 by addition of an acid exchange resin [Dowex 50(H+)]. The mixture was thereupon filtered again and the resin-free solution was distilled to a volume of 25 ml. at 40° C. and under reduced pressure. The solution was then passed over 75 ml. of fresh Dowex 50 resin. The resin was eluted with water until the pH of the eluate was in the range of 4–5. The pH of the resulting solution was adjusted to 7.5 by the addition of concentrated ammonia hydroxide. The product-containing solution about 200 ml. was absorbed into a column charged with Dowex AG–1 (formate) resin (125 ml.) and the column was eluted with 125 ml. of water. Thereafter, the column was eluted with 0.02 M formic acid solution and the eluate collected in 20 ml. fractions at a flow rate of 2 ml. per minute. After a 200 ml. forerun which was discarded, Fractions 13–33 were combined and lyophilized to give a white crystalline solid weighing 250 mg. This material when twice recrystallized from water at 4° gave fine needles of 1-β-D-arabinofuranosyl-cytosine 5′-phosphate having the following analysis:

Analysis.—Calcd. for $C_9H_{14}O_8N_3P$: C, 33.44; H, 4.37; N, 13.00; P, 9.58. Found: C, 33.37; H, 4.88; N, 12.61; P, 9.75.

EXAMPLE 69

$N^4$-benzoyl-1-β-D-arabinofuranosylcytosine 5′-phosphate

A solution was prepared containing 50 mmoles of pyridinium-2-cyanoethylphosphate, dissolved in 10 ml. of dry pyridine, and thereto was added 2.77 g. of $N^4$-benzoyl-1-(2′,3′-di-O-benzoyl-β-D-arabinofuranosyl)cytosine whereupon the solution was taken to dryness. The mixture was then dissolved in 25 ml. of pyridine, 3.09 (150 mmoles) of dicyclohexylcarbodiimide was added and the mixture shaken at room temperature for 5½ days. About 15 ml. of water was then added and the mixture extracted twice with Skellysolve B hexanes and filtered free of the insoluble urea compound. The solution was then diluted to 40 ml. with pyridine, chilled to about 0° with ice and made about 1 N in sodium hydroxide by the addition of 40 ml. of ice cold 2 N sodium hydroxide solution. The reaction was terminated after 20 minutes by adding an excess of pyridinium-Dowex 50X 8 resin. The resin was separated by filtration, washed with water and the aqueous washing and filtering were evaporated under reduced pressure to about 25 ml. following the addition of 200 mg. of ammonium bicarbonate. The precipitates in the 25 ml. of solution were removed by filtration. The filtrate was evaporated under reduced pressure and the residue taken up in a solvent system composed of 1 M ammonium acetate (pH 6) and isopropyl alcohol in a 2:5 ratio, then absorbed onto a cellulose column having a column volume of 1850 ml. made up with the same system. The column was then eluted with a solvent mixture consisting of a one molar aqueous ammonium acetate solution and isopropyl alcohol (2:5), the first 600 ml. of eluate was discarded. Then, fractions of 20 ml. each were collected (325 fractions total). Fractions 55–110, when combined, contained approximately 90% of theory of the total amount of $N^4$-benzoyl-1-β-arabinofuranosylcytosine 5′-phosphate. These fractions were evaporated to a small volume in the presence of 10 ml. of pyridine, the residue was diluted with water to a volume of 50 ml. and the product absorbed on a column charged with pyridinium-Dowex 50 W×8. The column was then eluted with 3 l. of deionized water. The total effluent was concentrated under reduced pressure and rediluted with 1% aqueous pyridine four times, followed by concentration. Finally, the residue was taken up in dilute aqueous pyridine and lyophilized twice from this solvent to give a white solid of $N^4$-benzoyl-1-β-D-arabinofuranosylcytosine 5′-phosphate in a yield of 1.81 g. (70%).

Analysis.—Calcd. for $C_{16}H_{18}N_3O_8P \cdot H_2O \cdot$Pyridine: P, 5.95. Found: P, 6.06.

Heating this solvate to 100° C. in vacuo (15 mm. Hg) for 72 hours gave $N^4$-benzoyl-1-β-D-arabinofuranosyl-cytosine 5′-phosphate.

In the same manner given in Example 68, other N-acyl-1-(2′,3′-di-O-acyl-β-D-arabinofuranosyl)-cytosines can be phosphorylated, losing the acyl groups in positions 2′, 3′ and the acyl group connected to the amino groups of the cytosine; e.g.

EXAMPLE 70

1-β-D-arabinofuranosylcytosine 5′-phosphate

In the manner given in Example 68, treating $N^4$-(β-cyclopentylpropionyl)-1-[2′,3′-di-O-(β-cyclopentylpropionyl)-β-D-arabinofuranosyl]cytosine with 2-cyanoethylphosphate, then di-cyclohexylcarbodiimide, and thereafter with lithium hydroxide at the reflux temperature of the reaction mixture, gave 1-β-D-arabinofuranosylcytosine 5′-phosphate.

EXAMPLE 71

1-β-D-arabinofuranosylcytosine 5′-phosphate

In the manner given in Example 68, treating $N^4$-lauroyl-1-(2′,3′-di-O-lauroyl-β-D-arabinofuranosyl)cytosine with 2-cyanoethylphosphate, then dicyclohexylcarbodiimide and finally lithium hydroxide at the reflux temperature of the reaction mixture gave 1-β-D-arabinofuranosylcytosine 5′-phosphate.

Following the procedure of Example 68, $N^4$-decanoyl-1-(2′,3′-di-O-decanoyl-β-D-arabinofuranosyl)cytosine, $N^4$-propionyl-1-(2′,3′-di-O-propionyl-β-D-arabinofuranosyl)cytosine, 1-(2′-3′-di-O-butyryl-β-D-arabinofuranosyl)uracil, $N^4$-phenyl-acetyl-1-(2′,3′-di-O-phenylacetyl-β-D-arabinofuranosyl)cytosine, $N^4$-hexanoyl-1-(2′,3′-di-O-hexanoyl-β-D-arabinofuranosyl)cytosine, $N^4$-phenyl-propionyl-1-(2′,3′-di-O-phenylpropionyl-β-D-arabinofuranosyl)cytosine, $N^6$-anisoyl-1-(2′-3′-di-O-anisoyl-β-D-arabinofuranosyl)-adenine, $N^4$-octanoyl-1-(2′,3′-di-O-octanoyl-β-D-arabinofuranosyl)-3-methylcytosine, $N^4$-butyryl-1-(2′,3′-di-O-butyryl-β-D-arabinofuranosyl)5-methylcytosine, $N^2$-anisoyl-1-(2′-3′-di-O-anisoyl-β-D-arabinofuranosyl)guanine, 9-(2′,3′-di-O-lauroyl-β-D-ribofuranosyl)-xanthine, $N^4$-octanoyl-1-(2′,3′-di-O-octanoyl-β-D-arabinofuranosyl)-3-methylcytosine, 1-(2′,3′-di-O-decanoyl-β-D-ribofuranosyl)thymine, $N^4$-butyryl-1(2′,3′-di-O-butyryl-β-D-arabinofuranosyl)5-methylcytosine, 9-(2′,3′-di-O-phenylacetyl-β-D-arabinofuranosyl)6-mercaptopurine, $N^4$-propionyl-1-(2′,3′-di-O-propionyl-β-D-arabinofuranosyl)5-methylcytosine, 1-[2′,3′-di-O-(β-cyclopentyl-propionyl)-β-D-ribofuranosyl]5-iodouracil, 1-(2′,3′-di-O-anisoyl-β-D-ribofuranosyl)5-fluorouracil, 1-(3′-O-valeryl-β-D-deoxyribofuranosyl)uracil, 1-(2′,3′-di-O-benzoyl-β-D-ribofuranosyl)5-trifluoromethyluracil, 1-(3′-O-hexanoyl-β-D-deoxyribofuranosyl)-thymine, can be converted to the corresponding unacylated 5′-phosphate 1′-substituted arabinofuranosyl, -ribofuranosyl or -deoxyribofuranosyl products. Representative compounds obtained in this manner include: 1-β-D-arabinofuranosyladenine 5′-phosphate, 1-β-D-arabinofuranosyl-3-methylcytosine 5′-phosphate, 1-β-D-arabinofuranosyl-5-methylcytosine 5′-phosphate, 1-β-D-arabinofuranosyluracil 5'-phosphate, 9-β-D-arabinofuranosylxanthine 5'-phosphate, 9-β-D-arabinofuranosylhypoxanthine 5'-phosphate, 1-β-D-arabinofuranosylthymine 5'-phosphate, 9-β-D-arabinofuranosyl-6-mercaptopurine 5'-phosphate, 1-β - D - arabinofuranosyl-5-fluorouracil 5'-phosphate, 1-β-D-arabinofuransyl-5-chlorouracil 5'-phosphate, 1-β-D-arabinofuranosyl-5-bromouracil 5'-phosphate, 1-β-D-arabinofuranosyl-5-iodouracil 5'-phosphate, 1-β-D-arabinofuranosyl-5-trifluoromethyluracil 5'-phosphate, 1-β-D-ribofuranosyl-5-fluorouracil 5'-phosphate, 1-β-D-ribofuranosyl-5-trifluoromethyluracil 5'-phosphate, 9-β-D-ribofuranosylxanthine 5'-phosphate, 9-β-D-ribofuranosylguanine 5'-phosphate, 1-β-D-ribofuranosyluracil-5'-phosphate, 1-β-D-ribonfuranosylcytosine 5'-phosphate, 1-β-D-ribofuranosylthymine 5'-phosphate, 9-β-D-ribofuranosyladenine 5'-phosphate, 9-β-D-ribonfuranosylxanthine 5'-phosphate, 9-β-D-ribofuranosyl-6-mercaptopurine 5'-phosphate, 1-β-D-ribonfuranosyl-5-iodouracil 5'-phosphate, 1-β-D-deoxyribofuranosyluracil 5'-phosphate, 1-β-D-deoxyribofuranosylthymine 5'-phosphate, 9-β-D-deoxyribofuranosylhypoxanthine 5'-phosphate, 9-β-D-deoxyribofuranosylthymine 5'-phosphate, 9 - β - D-deoxyribofuranosyladenine 5'-phosphate, 1-β-D-deoxyribofuranosylcytosine 5'-phosphate, 9-β-D-deoxyribofuranosylguanine 5'-phosphate, 1-β-D-deoxyribofuranosyl-5-fluorouracil 5'-phosphate, 9-β-D-deoxyribofuranosylxanthine 5'-phosphate and the like.

EXAMPLE 72

$N^4$-benzoyl-1-(2',3'-di-O-acetyl-β-D-arabinofuranosyl)-cytosine 5'-phosphate

A solution of $N^4$-benzoyl-1-β-D-arabinofuranosylcytosine 5'-phosphate (Example 69) was suspended in a mixture of 15 ml. pyridine, 15 ml. acetic anhydride. This mixture was stirred for about 18 hours at room temperature. The solution was then diluated with 15 ml. of water and stirred for 3 hours at room temperature. The solvent was then removed at 30° under high vacuum and the residue triturated with ether. A gummy material remained which was freed from ether in vacuo, then dissolved in dry pyridine and the solution stored at 4°. The solid which separated by this procedure, when collected on a filter, represented pure $N^4$-benzoyl-1-(2',3'-di-D-acetyl-β-D-arabinofuranosyl)cytosine 5'-phosphate.

EXAMPLE 73

$N^4$-benzoyl-1-(2',3'-di-O-propionyl-β-D-arabinofuranosyl)-cytosine 5'-phosphate In the manner given in Example 72, treating $N^4$-benzoyl-1-β-D-arabinofuranosylcytosine 5'-phosphate with propionic anhydrided in pyridine gives $N^4$-benzoyl-1-(2',3'-di-O-propionyl-β-D-arabinofuranosyl)cytosine 5'-phosphate.

EXAMPLE 74

$N^4$-benzoyl-1-(2',3'-di-O-butyryl-β-D-arabinofuranosyl)-cytosine 5'-phosphate

In the manner given in Example 72, treating $N^4$-benzoyl-β-D arabinofuranosylcytosine 5'-phosphate with butyric anhydride in pyridine gives $N^4$-benzoyl-1-(2',3'-di-O-butyryl-β-D-arabinofuranosyl)cytosine 5'-phosphate.

EXAMPLE 75

$N^4$-benzoyl-1-(2',3'-di-O-benzoyl-β-D-arabinofuranosyl)-cytosine 5'-phosphate

In the manner given in Example 72, treating $N^4$-benzoyl 1-β-D-arabinofuranosylcytosine 5'-phosphate with benzoic anhydride in pyridine gives $N^4$-benzoyl-1-(2',3'-di-O-benzoyl-β-D-arabinofuranosyl)cytosine 5'-phosphate.

EXAMPLE 76

$N^4$-benzoyl-1-(2',3'-di-O-phenylacetyl-β-D-arabinofuranosyl)cytosine 5'-phosphate In the manner given in Example 72, treating $N^4$-benzoyl-1-β-O-arabinofuranosylcytosine 5'-phosphate with phenylacetic anhydride in pyridine gives $N^4$-benzoyl-1-(2', 3' - di-O-phenylacetyl-β-D-arabinofuranosyl)cytosine 5'-phosphate.

EXAMPLE 77

$N^4$-anisoyl-1-(2',3'-di-O-valeryl-β-D-arabinofuranosyl)-cytosine 5'-phosphate

In the manner given in Example 72, treating $N^4$-anisoyl-1-β-D-arabinofuranosylcytosine 5'-phosphate with valeric anhydride in pyridine gives $N^4$-(2',3'-di-O-valeryl-β-D-arabinofuranosyl)-cytosine 5-phosphate.

EXAMPLE 78

$N^4$-acetyl-1-(2',3'-di-O-acetyl-β-D-arabinofuranosyl)-cytosine 5'-phosphate

In the manner given in Example 72, 1-β-D-arabinofuranosylcytosine 5'-phosphate was reacted with excess acetic anhydride and tetraethyl ammonium acetate in pyridine to give $N^4$-acetyl-1-(2',3'-di-O-acetyl-β-D-arabinofuranosyl)cytosine 5'-phosphate.

EXAMPLE 79

$N^4$-propionyl-1-(2',3'-di-O-propionyl-β-D-arabinofuranosyl)cytosine 5'-phosphate In the manner given in Example 72, 1-β-D-arabinofuranosylcytosine 5'-phosphate was reacted with excess propionic anhydride in pyridine to give $N^4$-propionyl-1-(2',3'-di-O-propionyl-β-D-arabinofuranosyl)cytosine 5'-phosphate.

EXAMPLE 80

$N^6$-phenylpropionyl-9-(2'3'-di-O-phenylpropionyl-β-D-arabinofuranosyl)adenine 5'-phosphate In the manner given in Example 72, 1-β-D-arabinofuranosyl-adenine 5'-phosphate was reacted with excess phenylpropionic anhydride in pyridine to give $N^6$-phenylpropionyl - 1 - (2',3'-di-O-phenylpropionyl-β-D-arabinofuranosyl)adenine 5'-phosphate.

EXAMPLE 81

1'(2',3'-di-O-benzoyl-β-D-arabinofuranosyl)uracil 5'-phosphate

In the manner given in Example 71, 1-β-D-arabinofuranosyl-uracil 5'-phosphate was reacted with excess benzoic anhydride in pyridine to give 1-(2',3'-di-O-benzoyl-β-D-arabinofuranosyl)uracil 5'-phosphate.

EXAMPLE 82

9-(2',3'-di-O-hexanoyl-β-D-arabinofuranosyl)xanthine-5'-phosphate

In the manner given in Example 72, 1-β-D-arabinofuranosyl-xanthine 5'-phosphate was reacted with excess hexanoic anhydride in pyridine to give 9-(2',3'-di-O-hexanoyl-β-D-arabinofuranosyl)xanthine 5'-phosphate.

EXAMPLE 83

9-[2',3'-di-O-(β-cyclopentylpropionyl)-β-D-arabinofuranosyl]6-mercaptopurine 5'-phosphate In the manner given in Example 72, 1-β-D-arabinofuranosyl-6-mercaptopurine 5'-phosphate was reacted with excess β-cyclopentylpropionyl chloride in pyridine to give 9 - [2',3' - di-O-(β-cyclopentylpropionyl)-β-D-arabinofuranosyl]6-mercaptopurine 5'-phosphate.

EXAMPLE 84

$N^2$-lauroyl-9-(2',3'-di-O-lauroyl-β-D-arabinofuranosyl)guanine 5'-phosphate

In the manner given in Example 72, 9-β-D-arabinofuranosyl-guanine 5'-phosphate was reacted with excess lauroyl chloride in pyridine to give $N^2$-lauroyl-9-(2',3'-di-O-lauroyl-β-D-arabinofuranosyl)guanine 5'-phosphate.

EXAMPLE 85

*1-(2'-3'-di-O-decanoyl-β-D-arabinofuranosyl) thymine 5'-phosphate*

In the manner given in Example 72, 1-β-D-arabinofuranosyl-thymine 5'-phosphate was reacted with excess decanoyl chloride in pyridine to give 1-(2',3'-di-O-decanoyl-β-D-arabinofuranosyl)thymine 5'-phosphate.

EXAMPLE 86

*N⁴-benzoyl-1-(2',3'-di-O-propionyl-β-D-ribofuranosyl)-cytosine 5'-phosphate*

In the manner given in Example 72, treating N⁴-benzoyl-1-β-D-ribofuranosylcytosine 5'-phosphate with propionic anhydride in pyridine gives N⁴-benzoyl-1-(2',3'-di-O-propionyl-β-D-ribofuranosyl)cytosine 5'-phosphate.

EXAMPLE 87

*N⁴-benzoyl-1-(2',3'-di-O-butyryl-β-D-ribofuranosyl)-cytosine 5'-phosphate*

In the manner given in Example 72, treating N⁴-benzoyl-1-β-D-ribofuranosylcytosine 5'-phosphate with butyric anhydride in pyridine gives N⁴-benzoyl-1-(2',3'-di-O-butyryl-β-D-ribofuranosyl)cytosine 5'-phosphate.

EXAMPLE 88

*N⁴-benzoyl-1-(2',3'-di-O-benzoyl-β-D-ribofuranosyl)-cytosine 5'-phosphate*

In the manner given in Example 72, treating N⁴-benzoyl-1-β-D-ribofuranosylcytosine 5'-phosphate with benzoic anhydride in pyridine gives N⁴-benzoyl-1-(2',3'-di-O-benzoyl-β-D-ribofuranosyl)cytosine 5'-phosphate.

EXAMPLE 89

*N⁶-benzoyl-9-(2',3'-di-O-propionyl-β-D-ribofuranosyl) adenine 5'-phosphate*

In the manner given in Example 72, treating N⁶-benzoyl-9-β-D-ribofuranosyladenine 5'-phosphate with propionic anhydride in pyridine gives N⁶-benzoyl-9-(2',3'-di-O-propionyl-β-D-ribofuranosyl)adenine 5'-phosphate.

EXAMPLE 90

*1-(2',3'-di-O-butyryl-β-D-ribofuranosyl)uracil 5'-phosphate*

In the manner given in Example 72, treating 1-β-D-ribofuranosyluracil 5'-phosphate with butyric anhydride in pyridine gives 1-(2',3'-di-β-butyryl-β-D-ribofuranosyl)-uracil 5'-phosphate.

EXAMPLE 91

*9-(2'-3'-di-O-benzoyl-β-D-ribofuranosyl)6-mercaptopurine 5'-phosphate*

In the manner given in Example 72, treating 9-β-D-ribofuranosyl-6-mercaptopurine 5'-phosphate with benzoic anhydride in pyridine gives 9-(2',3'-di-O-benzoyl-β-D-ribofuranosyl)6-mercaptopurine 5'-phosphate.

EXAMPLE 92

*1-(2',3'-di-O-phenylpropionyl-β-D-ribofuranosyl)5-fluorouracil 5'-phosphate*

In the manner given in Example 72, treating 1-β-D-ribofuranosyl-5-fluorouracil 5'-phosphate with phenylpropionic anhydride in pyridine gives 1-(2',3'-di-O-phenylpropionyl-β-D-ribofuranosyl)5-fluorouracil 5'-phosphate.

EXAMPLE 93

*N²-acetyl-1-(2',3'-di-O-octanoyl-β-D-ribofuranosyl) guanine 5'-phosphate*

In the manner given in Example 72, treating N²-acetyl-1-β-D-ribofuranosylguanine 5'-phosphate with octanoic anhydride in pyridine gives N²-acetyl-1-(2',3'-di-O-octanoyl-β-D-ribofuranosyl)guanine 5'-phosphate.

EXAMPLE 94

*1-(2',3'-di-O-benzoyl-β-D-ribofuranosyl)thymine 5'-phosphate*

In the manner given in Example 72, treating 1-β-D-ribofuranosylthymine 5'-phosphate with benzoic anhydride in pyridine gives 1-(2',3'-di-O-benzoyl-β-D-ribofuranosyl)-thymine 5'-phosphate.

EXAMPLE 95

*N⁴-benzoyl-1-(3'-O-propionyl-β-D-deoxyribofuranosyl)cytosine 5'-phosphate*

In the manner given in Example 72, treating N⁴-benzoyl-1-β-D-deoxyribofuranosylcytosine 5'-phosphate with propionic anhydride in pyridine gives N⁴-benzoyl-1-(3'-O-propionyl-β-D-deoxyribofuranosyl)cytosine 5'-phosphate.

EXAMPLE 96

*N⁴-benzoyl-1-(3'-O-butyryl-β-D-deoxyribofuranosyl)-cytosine 5'-phosphate*

In the manner given in Example 72, treating N⁴-benzoyl-1-β-D-deoxyribofuranosylcytosine 5'-phosphate with butyric anhydride in pyridine gives N⁴-benzoyl-1-(3'-O-butyryl-β-D-deoxyribofuranosyl)cytosine 5'-phosphate.

EXAMPLE 97

*N⁴-benzoyl-1-(3'-O-benzoyl-β-D-deoxyribofuranosyl)cytosine 5'-phosphate*

In the manner given in Example 72, treating N⁴-benzoyl-1-β-D-deoxyribofuranosylcytosine 5'-phosphate with benzoic anhydride in pyridine gives N⁴-benzoyl-1-(3'-O-benzoyl-β-D-deoxyribofuranosyl)cytosine 5'-phosphate.

EXAMPLE 98

*N⁶-benzoyl-9-(3'-O-propionyl-β-D-deoxyribofuranosyl)adenine 5'-phosphate*

In the manner given in Example 72, treating N⁶-benzoyl-9-β-D-deoxyribofuranosyladenine 5'-phosphate with propionic anhydride in pyridine gives N⁶-benzoyl-1-(3'-O-propionyl-β-D-deoxyribofuranosyl)adenine 5'-phosphate.

EXAMPLE 99

*N²-phenylacetyl-1-(3'-O-butyryl-β-D-deoxyribofuranosyl)guanine 5'-phosphate*

In the manner given in Example 72, treating N²-phenylacetyl-1-β-D-deoxyribofuranosylguanine 5'-phosphate with butyric anhydride in pyridine gives N²-phenylacetyl-1-(3'-O-butyryl-β-D-deoxyribofuranosyl)guanine 5'-phosphate.

EXAMPLE 100

*1-(3'-O-benzoyl-β-D-deoxyribofuranosyl)uracil 5'-phosphate*

In the manner given in Example 72, treating 1-β-D-deoxyribofuranosyluracil 5'-phosphate with benzoic anhydride in pyridine gives 1-(3'-O-benzoyl-β-D-deoxyribofuranosyl)uracil 5'-phosphate.

EXAMPLE 101

*9-(3'-O-valeryl-β-D-deoxyribofuranosyl)-hypoxanthine 5'-phosphate*

In the manner given in Example 72, treating 9-β-D-deoxyribofuranosylhypoxanthine 5'-phosphate with valeric anhydride in pyridine gives 9-(3'-O-valeryl-β-D-deoxyribofuranosyl)hypoxanthine 5'-phosphate.

EXAMPLE 102

*N⁴-propionyl-1-(3'-O-butyryl-β-D-deoxyribofuranosyl)-3-methylcytosine 5'-phosphate*

In the manner given in Example 72, treating N⁴-propionyl-1-β-D-deoxyribofuranosyl-3-methylcytosine 5'-phosphate with butyric anhydride in pyridine gives N⁴-propionyl-1-(3'-O-butyryl-β-D-deoxyribofuranosyl)3-methylcytosine 5'-phosphate.

EXAMPLE 103

*1-(3'-O-lauroyl-β-D-deoxyribofuranosyl)5'-trifluoromethyluracil 5'-phosphate*

In the manner given in Example 72, treating 1-β-D-deoxyribofuranosyl-5'-trifluoromethyluracil 5'-phosphate with lauroyl chloride in pyridine gives 1-(3'-O-lauroyl-β-D-deoxyribofuranosyl)5'-trifluoromethyluracil 5'-phosphate.

EXAMPLE 104

*1-(3'-O-hexanoyl-β-D-deoxyribofuranosyl)-thymine 5'-phosphate*

In the manner given in Example 72, treating 1-β-D-deoxyribofuranosylthymine 5'-phosphate with hexanoyl anhydride in pyridine gives 1-(3'-O-hexanoyl-β-D-deoxyribofuranosyl)thymine 5'-phosphate.

EXAMPLE 105

*9-(3'-O-anisoyl-β-D-deoxyribofuranosyl)6-mercaptopurine 5'-phosphate*

In the manner given in Example 72, treating 1-β-D-deoxyribofuranosyl-6-mercaptopurine 5'-phosphate with anisoyl chloride in pyridine gives 1-(3'-O-anisoyl-β-D-deoxyribofuranosyl)6-mercaptopurine 5'-phosphate.

EXAMPLE 106

*$N^4$-benzoyl-1-(5'-O-triphenylmethyl-β-D-arabinofuranosyl)cytosine*

A. $N^4$-*benzoyl-1-β-D-arabinofuranosylcytosine.*—A solution containing 0.5 g. of $N^4$-benzoyl-1-(2',3'-di-O-benzoyl-β-D-arabinofuranosyl)cytosine, dissolved in 17 ml. of ethanol, was cooled to 5° C. and thereto was added 0.4 g. of sodium hydroxide in 3 ml. of water. The mixture was allowed to stand at 5° C. for 30 minutes, then poured into 80 ml. of ice water, neutralized with 1 N hydrochloric acid and then filtered. The precipitate which was collected was washed on the filter with water and then twice recrystallized from ethanol-Skellysolve to give $N^4$-benzoyl-1-β-D-arabinofuranosylcytosine.

B. $N^4$-*benzoyl-1-(5'-O-triphenylmethyl-β-D-arabinofuranosyl)cytosine.*—In the manner given in Example 1, $N^4$-benzoyl-1-β-D-arabinofuranosylcytosine was treated with triphenylchloromethane at 22–25° C. for 8 days to give $N^4$ - benzoyl - 1 - (5' - O - triphenylmethyl - β - D-arabinofuranosyl)cytosine.

EXAMPLE 107

*$N^6$-butyryl-1-(5'-O-triphenylmethyl-β-D-arabinofuranosyl)adenine*

A. $N^6$-*butyryl-1-β-D-arabinofuranosyladenine.*—In the manner given in Example 106 $N^6$-butyryl-1-(2',3'-di-O-butyryl-β-D-arabinofuranosyl)cytosine was treated at 5° C. with sodium hydroxide to give $N^6$-butyryl-1-β-D-arabinofuranosyladenine.

B. $N^6$-*butyryl-1-(5' - O-triphenylmethyl - β-D-arabinofuranosyl)adenine.*—In the manner given in Example 1, $N^6$-butyryl-1-β-D-arabinofuranosyladenine was treated with triphenylchloromethane at 22–25° C. for 8 days to give $N^6$-butyryl-1-(5'-O-triphenylmethyl-β-D-arabinofuranosyl)adenine.

EXAMPLE 108

*$N^2$-benzoyl-9-(5'-O-triphenylmethyl-β-D-arabinofuranosyl)guanine*

A. $N^2$*benzoyl-9-β-D-arabinofuranosylguanine.*—In the manner given in Example 106 $N^2$-benzoyl-9-(2',3'-di-O-benzoyl-β-D-arabinofuranosyl)guanine (Example 42) was treated at 5° C. with sodium hydroxide to give $N^2$-benzoyl-9-β-D-arabinofuranosylguanine.

B. $N^2$-*benzoyl-9-(5'-O - triphenylmethyl-β-D-arabinofuranosyl)guanine.*—In the manner given in Example 1, $N^2$-benzoyl-1-β-D-arabinofuranosylguanine was treated with triphenylchloromethane at 22–25° C. for 8 days to give $N^2$-benzoyl-9-(5'-O - triphenylmethyl-β-D-arabinofuranosyl)guanine.

EXAMPLE 109

*$N^4$-valeryl-1-(5'-O-triphenylmethyl-β-D-arabinofuranosyl)5-methylcytosine*

A. $N^4$-*valeryl-1-β-D - arabinofuranosyl - 5-methylcytosine.*—In the manner given in Example 106 $N^4$-valeryl-1-(2',3'-di-O-valeryl-β - D-arabinofuranosyl)5-methylcytosine was treated at 5° with sodium hydroxide to give $N^4$-valeryl-1-β-D-arabinofuranosyl-5-methylcytosine.

B. $N^4$*valeryl-1-(5' - O - triphenylmethyl-β-D-arabinofuranosyl)5-methylcytosine.*—In the manner given in Example 1, $N^4$-valeryl-1-β-D-arabinofuranosyl-5-methylcytosine was treated triphenylchloromethane at 22–25° C. for 8 days to give $N^4$-valeryl-1-(5'-O-triphenylmethyl-β-D-arabinofuranosyl)5-methylcytosine.

EXAMPLE 110

*$N^4$lauroyl-1-(5'-O-triphenylmethyl-β-D-arabinofuranosyl)3-methylcytosine*

A. $N^4$-*lauroyl-1-β-D - arabinofuranosyl - 3-methylcytosine.*—In the manner given in Example 106 $N^4$-lauroyl-1-(2',3'-di-O-lauroyl-β-D - arabinofuranosyl)3-methylcytosine was treated at 5° with sodium hydroxide to give $N^4$-lauroyl-1-β-D-arabinofuranosyl-3-methylcytosine.

B. $N^4$-*lauroyl-1-(5'-O-triphenylmethyl - β-D-arabinofuranosyl)3-methylcytosine.*—In the manner given in Example 1, $N^4$-lauroyl-1-β-D-arabinofuranosyl-3-methylcytosine was treated with triphenylchloromethane at 22–25° C. for 8 days to give $N^4$-lauroyl-1-(5'-O-triphenylmethyl-β-D-arabinofuranosyl)3-methylcytosine

EXAMPLE 111

*$N^4$-benzoyl-1-(5'-O-triphenylmethyl-β-D-ribofuranosyl)cytosine*

A. $N^4$*benzoyl-1-β-D - ribofuranosylcytosine.*—In the manner given in Example 106 $N^4$-benzoyl-1-(2',3'-di-O-benzoyl-β-D-ribofuranosyl)cytosine was treated at 5° with sodium hydroxide to give $N^4$-benzoyl-1-β-D-ribofuranosylcytosine.

B. $N^4$*benzoyl-1-(5'-O-triphenylmethyl-β-D-ribofuranosyl)cytosine.*—In the manner given in Example 1, $N^4$-benzoyl-1-β-D-ribofuranosylcytosine was treated with triphenylchloromethane at 22–25° C. for 8 days to give $N^4$-benzoyl-1-(5'-O-triphenylmethyl - β-D-ribofuranosyl)cytosine.

EXAMPLE 112

*$N^6$-acetyl-9-(5'-O-triphenylmethyl-β-D-ribofuranosyl)adenine*

A. $N^6$-*acetyl-9-β - D - ribofuranosyladenine.*—In the manner given in Example 106 $N^6$-acetyl-9-(2',3'-di-O-acetyl-β-D-ribofuranosyl)adenine was treated at 5° with sodium hydroxide to give $N^6$-acetyl-9-β-D-ribofuranosyladenine.

B. $N^6$-*acetyl-9-(5'-O-triphenylmethyl - β-D-ribofuranosyl)adenine.*—In the manner given in Example 1, $N^6$-acetyl-9-β-D-ribofuranosyladenine was treated with triphenylchloromethane at 22–25° C. for 8 days to give $N^6$-acetyl-9-(5'-O-triphenylmethyl - β - D-ribofuranosyl)adenine.

In the same manner given in Example 106, other compounds of Formula VIII are obtainable by treating a product of structure VII with a base to give compound VIIIa and etherifying the product. Representative products (of Formula VIII) thus obtained include:

$N^4$-acetyl-1-(5'-O-triphenylmethyl-β-D-arabinofuranosyl)cytosine, $N^4$-propionyl-1-(5'-O-triphenylmethyl-β-D-arabinofuranosyl)cytosine, $N^4$-butyryl-1-(5'-O-triphenylmethyl-β-D-arabinofuranosyl)cytosine, $N^4$-valeryl-1-(5'-O-triphenylmethyl-β-D-arabinofuranosyl)cytosine, $N^4$-hexanoyl-1-(5'-O-triphenylmethyl-β-D-arabinofuranosyl)cytosine, N⁴-octanoyl-1-(5'-O-triphenylmethyl-β-D-arabinofuranosyl)cytosine,
N⁴-lauroyl-1-(5'-O-triphenylmethyl-β-D-arabinofuranosyl)cytosine,
N⁴-phenylacetyl-1-(5'-O-triphenylmethyl-β-D-arabinofuranosyl)cytosine,
N⁴lauroyl-1-(5'-O-triphenylmethyl-β-D-ribofuranosyl)cytosine,
N⁶-phenylacetyl-9-(5'-O-triphenylmethyl-β-D-ribofuranosyl)adenine,
N⁴-benzoyl-1-(5'-O-triphenylmethyl-β-D-ribofuranosyl)3-methylcytosine,
N⁴-heptanoyl-1-(5'-O-triphenylmethyl-β-D-ribofuranosyl)5-methylcytosine,
N²-butyryl-9-(5'-O-triphenylmethyl-β-D-ribofuranosyl)guanine,
N²-anisoyl-9-(5'-O-triphenylmethyl-β-D-ribofuranosyl)guanine,
N²-decanoyl-9-[5'-O-(p-methoxyphenyl)diphenylmethyl-β-D-ribofuranosyl]adenine,
N⁴-propionyl-1-[5'-O-(p-methoxyphenyl)diphenylmethyl-β-D-ribofuranosyl]5-methylcytosine,
N⁴-phenylacetyl-1-[5'-O-(p-methoxyphenyl)diphenylmethyl-β-D-deoxyribofuranosyl]3-methylcytosine,
and the like.

EXAMPLE 113

$N^4$-anisoyl-1 - [5' - (p-methoxyphenyl)diphenylmethyl-β-D-arabinofuranosyl]cytosin-3' - yl 1-(3'-O-acetyl-β-D-deoxyribofuranosyl)uracil-5'-yl phosphate (XIII); $N^4$-anisoyl-1-[5' - (p-methoxyphenyl)diphenylmethyl-β-D-arabinofuranosyl]cytosin - 2'-yl 1-(3'-O-acetyl-β-D-deoxyribofuranosyl)uracil-5'-yl phosphate (XIV); 1-β-D-arabinofuranosylcytosin - 2'-yl 1-β-D-deoxyribofuranosyluracil-5'-yl phosphate (XV); and 1- -D-arabinofuranosylcytosin-3'-yl 1-β-D-deoxyribofuranosyluracil-5'-yl phosphate (XVI).

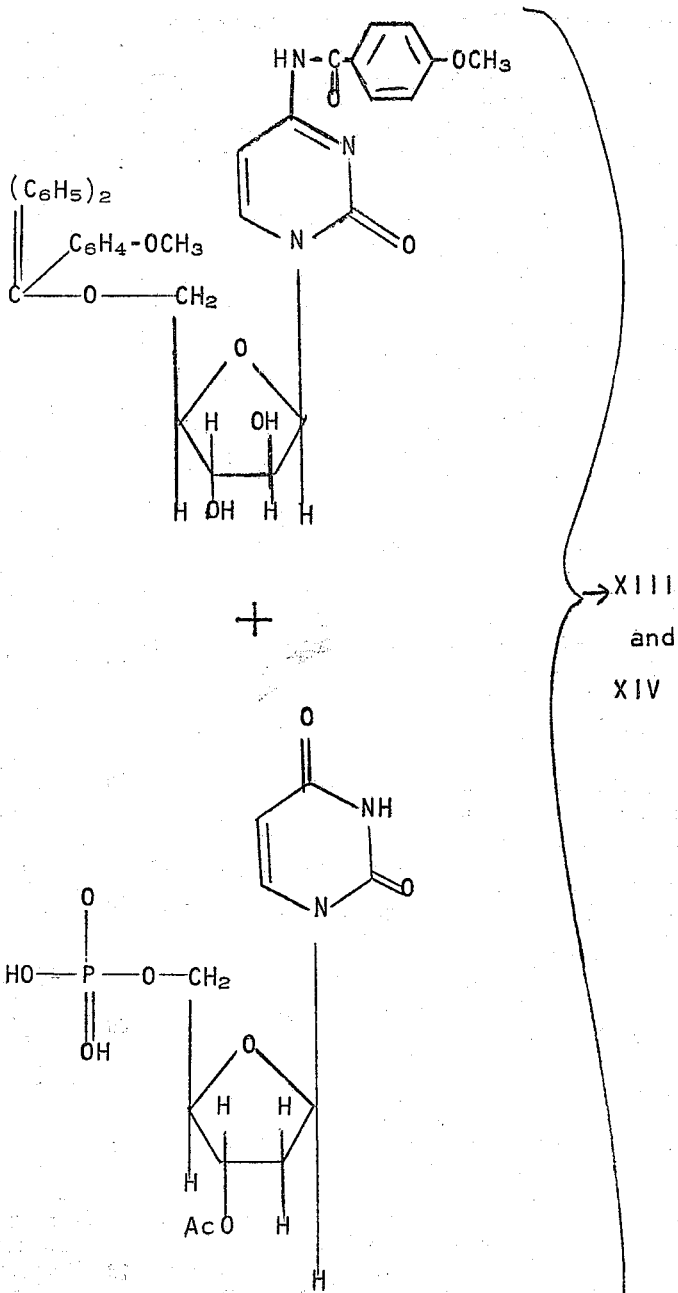

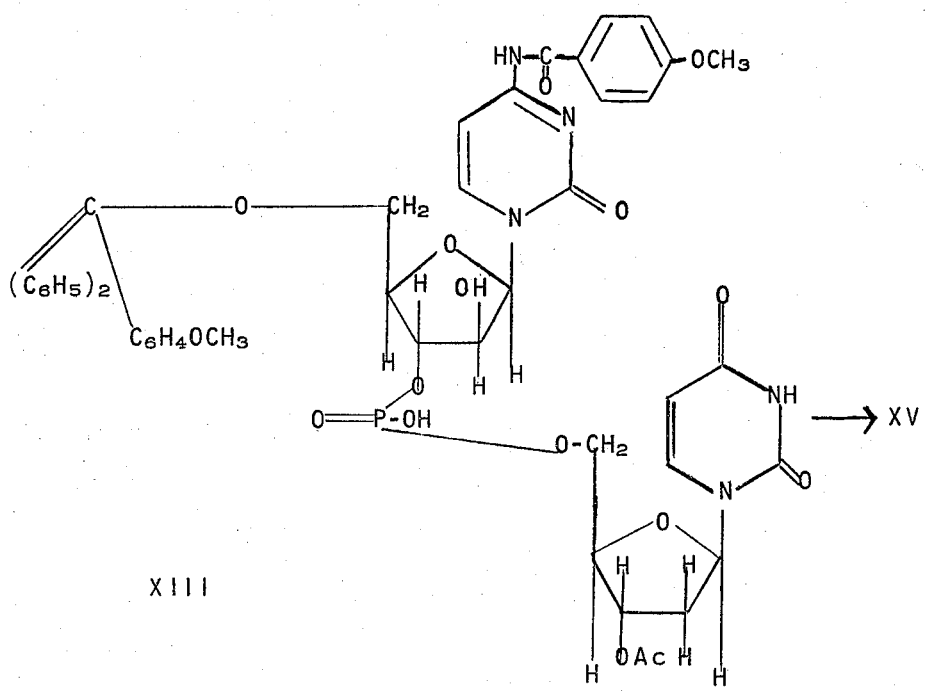
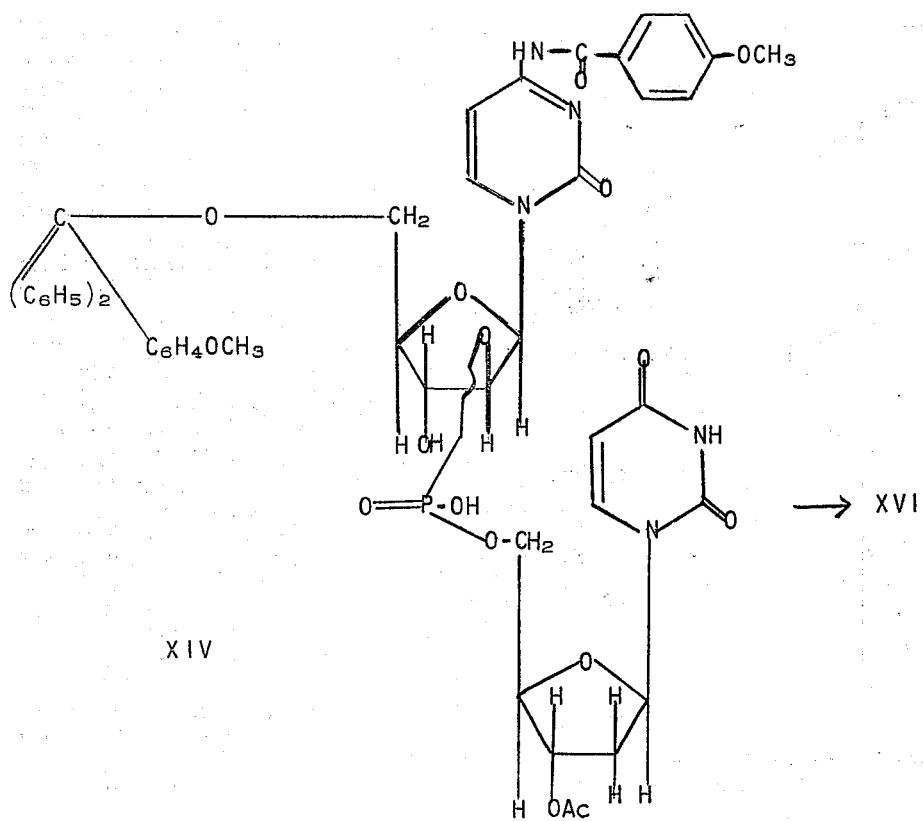

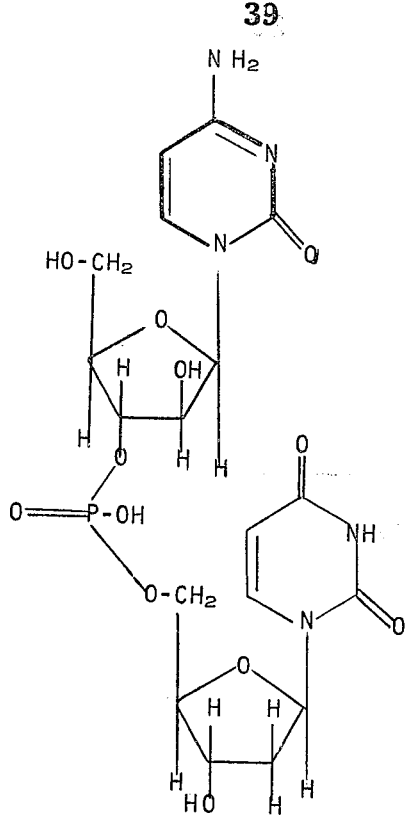

XV

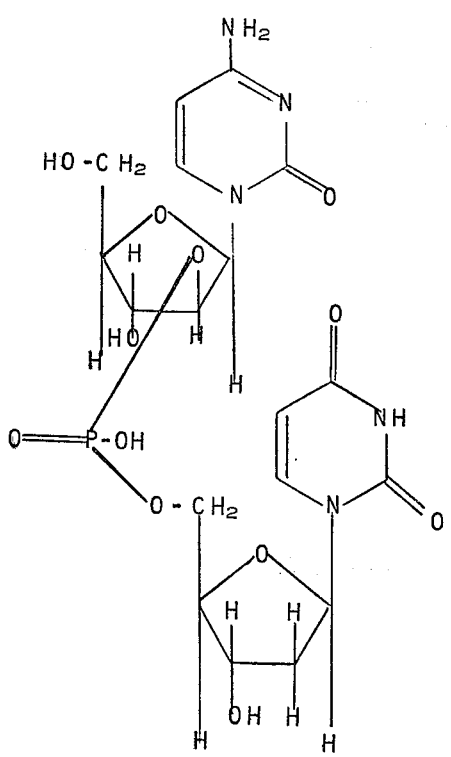

XVI

A mixture of 900 mg. (1.38 millimoles) of N⁴-anisoyl-1 - [5' - (p-methoxyphenyl)diphenylmethyl-β-D-arabinofuranosyl]cytosine and 1.38 millimoles of 1-(3'-acetyl-β-D-deoxyribofuranosyl)-uracil-5'-yl phosphate in 2ml. of pyridine is rendered anhydrous by several evaporations with anhydrous pyridine under reduced pressure. The dry residue was then dissolved in 16 ml. of dry pyridine and thereto was adde 3 g. of dicycloheylcarbodiimide. The mixture was kept in a sealed container and shaken in the dark at room temperature (22–36° C.) for a period of 5 days. Thereafter 6 ml. of aqueous pyridine, 1 part of water: 2 parts of pyridine, was added and after shaking the insoluble urea was removed by filtration and the precipitate washed with 20 ml. of pyridine. The filtrate and washings were extracted twice with a cyclohexane ether mixture (1:1). The cyclohexane ether mixture was discarded and the pyridine solution taken to a small volume in vacuo at 30° C. The residue was then diluted with 20 ml. of pyridine and reduced as before to about 5 ml. in volume. Chromatography on DEAE-cellulose (diethylaminoethyl-cellulose) with 50% ethanol-50% buffer over a gradient of from 0.02 to 1M aqueous triethylamine acetate (pH 7.5) gave N⁴-anisoyl-1-[5'-(p-methoxyphenyl) diphenylmethyl-β-D-arabinofuranosyl]-cytosin-3'-yl 1 - (3'-O-acetyl-β-D-deoxyribofuranosyl) uracil-5'-yl phosphate XIII and N⁴-anisoyl-1-[5'-(p-methoxyphenyl)diphenyl-methyl-β-D - arabinofuranosyl]cytosin-2'-yl 1-(3'-O-acetyl-β-D-deoxyribofuranosyl) uracil-5'-yl phosphate XIV. The compounds XIII and XIV could be separated by Craig counter current distribution.

To obtain the unacylated compound, a similar solution (5 ml., as above) was made up with pyridine to 25 ml. and treated with 60 ml. of alcoholic ammonia containing 3 parts of concentrated ammonium hydroxide in 1 part of ethanol. The thus-obtained homogeneous solution was allowed to stand at room temperature for 2 days after which the solution was taken to dryness in vacuo at 30° C. The residue was taken up in 25 ml. of 80% acetic acid and after standing at room temperature for 35 hours the acid was removed employing a high vacuum pump. The thus-obtained residue was then suspended in 20 ml. of water, adjusted to pH 8 with 3 N ammonium hydroxide and the water-insolube material extracted with ether, twice. The ether extracts were discarded and the aqueous solution (27 ml.) were absorbed onto a DEAE-cellulose (carbonate) column having a column volume of 770 ml. The column was washed with 60 ml. of water which was discarded, and eluted with a gradient solution of from 0 to 0.25 molar triethylamine carbonate solution (pH 7.5). Fractions of 20 ml. each were collected at the flow rate between 0.5 to 1.5 ml. per minute. Fractions 110 to 140 were combined since they contained the desired material plus unreacted 1-β-D-deoxyribofuranosyluracil. These fractions, when evaporated, contained the desired compound in 28% yield. In order to rid the mixture of 1-β-D-deoxyribofuranosyluracil, all of the product was chromatographed on fiber paper (Whatman 3MM), prewashed with a solvent system consisting of isopropyl alcohol (7 parts), concentrated ammonium hydroxide (1 part) and 2 parts of water. Using the same solvent system for chromatography, approximately 500 optical density units (circa 25 mg.) of material was applied to each 6" sheet. The dinucleoside phosphate areas ($R_f$ 0.36) detected on the paper by Ultra Violet were cut out and eluted with water. In this manner 4620 optical density units of mixed 1-β-D-arabinofuranosylcytosin-3-yl, 1-β-D-deoxyribofuranosyluracil-5-yl phosphate and 1-β-D-arabinofuranosyl-cytosin-2-yl 1-β-D-deoxyribofuranosyluracil-5'-yl phosphate were isolated in water solution at pH 4.5 and stored in the frozen state. A Dowex 1X2 (formate) column having 50 ml. column volume was made up as described in J. Org. Chem. 29, 1078 (1964) and a portion of the above aqueous solution containing 2100 optical density units at 265 mμ applied at a pH of 8.5 (adjusted with N-ammonium hydroxide). The column was then eluted with a gradient solution of from 0.04 to 0.055 molar sodium formate (pH 5.0) employing 1 l. of each salt solution. The column fractions were analyzed at 265 mμ employing the Vanguard 1056 O.D., Ultra Violet Monitor, and 20 ml. fractions being collected at a natural column rate of 1.50 ml. per minute. The separation of the dinucleoside phosphates was quantitative. Fractions 41–49 (330 optical density unit at 265 mmµ) contained 1-β-D-arabinofuranosylcytosin-2'-yl 1-β-D-deoxyribofuranosyluracil-5'-yl phosphate XVI (in about 25% yield in the mixture). Compound XVI (270 optical density units, 269 mµ at pH 3.5) was resistant to venom diesterase, spleen diesterase, desoxyribonuclease and ribonuclease. Fractions 61–73 consisted of 1-β-D-arabinofuranosylcytosin-3'-yl 1-β-D-deoxyribofuranosyluracil-5'-yl phosphate (XV) [965 optical density units, 269 mµ at pH 2.0] which, when evaporated, formed a white fluffy powder which was submitted to analysis as follows:

Analysis.—Calcd. for $C_{18}H_{24}N_5O_{12}P \cdot 4H_2O$: C, 35.70; H, 5.49; N, 11.57. Found: C, 35.70; H, 5.33; N, 10.62.

This material (XV) was also resistant to ribonuclease and desoxyribonuclease, but was degraded to 1-β-D-arabinofuranosylcytosine-3-phosphate and to 1β-D-deoxyribofuranosyluracil by spleen diesterase and degraded to 1-β-D-arabinofuranosylcytosine by snake venom diesterase.

EXAMPLE 114

1-(5'-O-triphenylmethyl-β-D-deoxyribofuranosyl)-thymin-3' - yl, $N^4$ - benzoyl - 1-(2',3'-di-O-acetyl-β-arabinofuranosyl)cytosin-5'-yl phosphate and 1-β-D-deoxyribofuranosylthymin-3'-yl 1-β - D - arabinofuranosylcytosin-5'-yl phosphate triethylamine salt The nucleotide $N^4$-benzoyl - 1-(2',3'-di-O - acetyl-β-D-arabinofuranosyl)cytosin-5'-yl phosphate (3.2 millimoles) was taken to dryness several times at 40° C. with dry pyridine. To this product 1-(5'-triphenylmethyl-β-D-deoxyribofuranosyl)thymine (1.6 g., 3.3 millimoles) and 1 g. of dry pyridinum Dowex 50WX8 (1 g.) were added and the mixture taken to dryness twice with portions of dry pyridine. The thus-obtained organic residue was dissolved in 35 ml. of dry pyridine and thereto was added 6.8 g. of dicyclohexylcarbodiimide. The suspension was shaken in the dark, at room temperature, about 24° C., for a period of 4 days. 1.5 g. (3.1 millimoles) of 1-(5'-triphenylmethyl-β - D - deoxyribofuranosyl)thymine was added and the shaking continued for another two days. The reaction was terminated by the addition of 5 ml. of water. The thus-formed insoluble dicyclohexylurea was removed by filtration and the precipitated material on the filter was washed with 20 ml. of pyridine. The pyridine solution and washings were combined and evaporated in vacuo at 40° to give a residue which was distributed between 200 ml. of water and 100 ml. of ethyl acetate. The resulting suspension was again freed from urea by filtration and the ethyl acetate solution was washed with water, dried over anhydrous sodium sulfate and taken to dryness. The thus-obtained syrupy mixture was taken up with 40 ml. of methanol and the methanol solution taken to dryness in vacuo to give a solid of 1-(5'-O-triphenylmethyl-β-D-deoxyribofuranyl)thymin-3'-yl, $N^4$-benzyl-1-(2',3'-di-O-acetyl-β-D - arabinofuranyl)cytosin-5-yl-phosphate.

In order to obtain the unesterified and unetherified material, the above phosphate was taken up with 40 ml. of methanol and thereto was added concentrated ammonium hydroxide until the solution became turbid, (10 ml.). After standing 22 hours at room temperature the solvents were removed at 35° in a vacuum of about 15 mm. mercury, and the thus-obtained residue was suspended in 100 ml. of 80% acetic acid. After 4 days the acetic acid was removed at 35° (15 mm. mercury) and the residue resuspended in 40 ml. of water. The thus-obtained solution was adjusted to a pH of 8 with 3 N ammonium hydroxide. Addition of the ammonium hydroxide produced a suspension which was extracted with ether and filtered free of insoluble material. The remaining aqueous solution was rendered ether-free at reduced pressure. This solution was absorbed onto a diethylaminoethylcellulose column activated with 1.5 N ammonium carbonate. This column had a holdup of 1500 ml. The column was eluted with a gradient solution of from 0 to 0.12 molar triethylamine bicarbonate (pH 7); 10 l. of solvent were collected in 20 ml. fractions (initial column rate 1.2 ml. per minute). A forerun of 560 ml. was discarded. Fractions 130–330 were combined and freeze-dried giving a slightly colored residue. This residue was redissolved in aqueous ethanol, treated with activated charcoal (Darco G60), filtered and the filtrate freeze-dried to give the desired 1-β-D-deoxyribofuranosylthymin-3'-yl 1-β-D-arabinofuranosylcytosin - 5' - yl phosphate triethylamine salt. This material was redissolved and filtered through an acid exchange resin (Dowex 50WX8) and the filtrate concentrated to give 1-β-D-deoxyribofuranosylthymin-3'-yl- 1-β-D-arabinofuranosyl-cytosin-5'-yl phosphate. This material was not degraded by ribonucleic acid diesterase and deoxyribonucleic acid diesterase, but was completely degraded by snake venom diestrease to give 1-β-D-arabinofuranosylcytosine - 5' - phosphate and thymidine and by spleen diesterase to give 1-β-D-deoxyribofuranosylthymine-3' - phosphate and 1-β-D-arabinofuranosylcytosine.

In the same manner given above, the crude 1-β-D-deoxyribofuranosylthymin-3'- yl 1-β-D - arabinofuranosyl-cytosin-5'-yl phosphate can be eluted from a column with pyridine bicarbonate to give 1-β-D-deoxyribofuranosylthymin-3'-yl 1-β-D-arabinofuranocylcytosin - 5' - yl phosphate pyridine salt.

EXAMPLE 115

$N^4$ - arisoyl - 1-(5'-O-triphenylmethyl-β-D-arabinofuranosyl)cytosin-3'-yl $N^4$ - anisoyl-(2',3'-di-O-benzoyl-β-D-arabinofuranosyl)cytosin-5'-yl phosphate and $N^4$-anisoyl - 1 - (5'-O-triphenylmethyl- -D-arabinofuranosyl) cytosin-2'-yl $N^4$-anisoyl-1-(2',-3'-di-O-benzoyl - β - D-arabinofuranosyl)cytosin-5'-yl phosphate; 1-β-D-arabinofuranosylcytosin-3'-yl 1-β-D-arabinofuranosylcytosin-5'-yl phosphate and 1-β-D-arabinofuranosylcytosin-2'-yl 1-β-D-arabinofuranosylcytosin-5'-yl-phosphate In the manner given in Example 113, $N^4$-anisoyl-1-(5'-O-triphenylmethyl-β-D-arabinofuranosyl)cytosin - 5' - yl phosphate and $N^4$-anisoyl-(2',3'-di-O-benzoyl-β-D-arabinofuransyl-cytosin-5'-yl phosphate were reacted at room temperature in pyridine solution in the presence of dicyclohexylcarbodiimide to give the dinucleoside phosphate esters $N^4$-anisoyl-1-(5'-O-triphenylmethyl-β-D-O-arabinofuranosyl)cytosin - 3' - yl $N^4$-anisoyl-(2',3'-di-O-benzoyl-β-D-arabinofuranosyl)cytosin-5'-yl phosphate and $N^4$-anisoyl - 1 - (5'-O-triphenylmethyl-β-D-arabinofuranosyl)cytosin - 2' - yl $N^4$-anisoyl-(2',3'-di-O-benzoyl-β-D-arabinofuranosyl)cytosin-5'-yl phosphate.

Selectively hydrolyzing as in Example 113 the above dinucleoside phosphate esters with ammonical ethanol and subsequently with 80% aqueous acetic acid produced 1-β - D - arabinofuranosylcytosin - 3'-yl 1 - β - D - arabinofuranosylcytosin-5'-yl phosphate and 1-β-D-arabinofuranosylcytosin - 2'-yl 1-β-D-arabinofuranosylcytosin - 5' - yl phosphate.

EXAMPLE 116

$N^4$ - benzoyl - 1 - (5' - triphenylmethyl - β - D - arabinofuranosyl) cytosin - 2' - yl $N^6$ - decanoyl - 9 - (2',3'-di - O - decanoyl - β - D - ribofuranosyl)adenin - 5'-yl phosphate; $N^4$ - benzoyl - 1 - (5' - triphenylmethyl-β - D - arabinofuranosyl) - cytosin - 3' - yl $N^6$ - decanoyl - 9 - (2',3' - di - O - decanoyl - β - D - ribofuranosyl)adenin-5'-yl phosphate; and 1-β-D-arabinofuranosylcytosin - 2' - yl 9 - β - D - ribofuranosyladenin-5' - yl phosphate and 1 - β - D-arabinofuranosylcytosin-3'-yl 9-β-D-ribofuranosyladenin-5'-yl phosphate In the manner given in Example 113, $N^4$ - benzoyl-1 - (5' - triphenylmethyl - β - D - arabinofuranosyl)cytosin was reacted with $N^6$ - decanoyl - 9 - (2',3' - di-O - decanoyl - β - D - ribofuranosyl)adenine 5' - phosphate in the presence of dicyclohexylcarbodiimide to give a mixture of the two dinucleoside phosphate esters, $N^4$-benzoyl - 1 - (5' - triphenylmethyl - β - D - arabinofuranosyl)cytosin - 2' - yl $N^6$ - decanoyl - 9 - (2',3' - di-O - decanoyl - β - D - ribofuranosyl)adenin - 5' - yl phosphate and $N^4$ - benzoyl - 1 - (5' - triphenylmethyl-β - D - arabinofuranosyl)cytosin - 3' - yl $N^6$ - decanoyl-9 - (2',3' - di - O - decanoyl - β - D - ribofuranosyl)adenin-5' - yl phosphate, which can be separated by chromatography into the components.

Hydrolysis of the above dinucleoside phosphate esters with a solution of ammonium hydroxide in ethanol and subsequently with 80% aqueous acetic acid gave the free dinucleoside phosphates, 1 - β - D - arabinofuranosylcytosin - 2' - yl 9 - β - D - ribofuranosyladenin - 5' - yl phosphate and 1 - β - D - arabinofuranosylcytosin - 3'-yl 9 - β - D - ribofuranosyladenin - 5' - yl phosphate, which can be separated by chromatography as in Example 113.

EXAMPLE 117

$N^4$ - benzoyl - 1 - (5' - triphenylmethyl - β - D - arabinofuranosyl)cytosin - 2' - yl 9 - (2',3 - di - O - octanoyl-β - D - ribofuranosyl)6 - mercaptopurin - 5' - yl phosphate, $N^4$ - benzoyl - 1 - ᴀ5' - triphenylmethyl - β - D-arabinofuranosyl)cytosin - 3' - yl 9 - (2',3' - di - O-octanoyl - β - D - ribofuranosyl)6 - mercaptopurin-5' - yl phosphate; and 1 - β - D - arabinofuranosylcytosin - 2' - yl 9 - β - D - ribofuranosyl - 6 - mercaptopurin - 5' - yl phosphate and 1 - β - D - arabinofuranosylcytosin - 3' - yl 9 - β - D - ribofuranosyl - 6 - mercaptopurin - 5' - yl phosphate In the manner given in Example 113, $N^4$ - benzoyl-1 - (5' - triphenylmethyl - β - D - arabinofuranosyl)cytosine was reacted with 9 - (2',3' - di - O - octanoyl-β - D - ribofuranosyl)6 - mercaptopurine 5' - phosphate in the presence of dicyclohexylcarbodiimide to give a mixture of the two dinucleoside phosphate esters, $N^4$-benzoyl - 1 - (5' - triphenylmethyl- β - D - arabinofuranosyl)cytosin - 2' - yl 9 - (2',3' - di-O - octanoyl-β - D - ribofuranosyl) - 6 - mercaptopurin - 5' - yl phosphate and $N^4$ - benzoyl - 1 - (5' - triphenylmethyl - β-D - arabinofuranosyl)cytosin - 3' - yl 9 - (2',3' - di - O-octanoyl - β - D - ribofuranosyl)6-mercaptopurine phosphate which can be separated by chromotography into the components.

Hydrolysis of the dinucleoside phosphate esters with a solution of ammonium hydroxide in ethanol and subsequently with 80% aqueous acetic acid gave the free dinucleoside phosphates, 1 - β - arabinofuranosylcytosin-2' - yl 9 - β - D - ribofuranosyl - 6 - mercaptopurin - 5'-yl phosphate and 1 - β - D - arabinofuranosylcytosin-3' - yl 9 - β - D - ribofuranosyl - 6 - mercaptopurin - 5-yl phosphate, which were separated by chromatography as in Example 113.

EXAMPLE 118

$N^4$ - benzoyl - 1 - (5' - triphenylmethyl - β - D - arabinofuranosyl)cytosin - 2'-yl 1 - (2',3' - di - O - phenylacetyl - β - D - ribofuranosyl)thymin - 5' - yl phosphate, $N^4$ - benzoyl - 1 - (5' - triphenylmethyl - β-D - arabinofuranosyl)cytosin - 3' - yl 1 - (2',3' - di - O - phenylacetyl - β - D - ribofuranosyl)thymin - 5'-yl phosphate and 1 - β - D - arabinofuranosylcytosin-2' -yl 1 - β - D - ribofuranosylcytosin - 5' - yl phosphate and 1 - β - D - arabinofuranosylcytosin - 3' - yl 1 - β-D - ribofuranosylthymin - 5' - yl phosphate In the manner given in Example 113, $N^4$ - benzoyl-1 - (5' - triphenylmethyl - β - D - arabinofuranosylcytosine was reacted with 1 - (2',3' - di - O - phenylacetyl-β - D - ribofuranosyl)thymine 5' - phosphate in the presence of dicyclohexylcarbodiimide to give a mixture of the two dinucleoside phosphate esters $N^4$ - benzoyl - 1-(5' - triphenylmethyl - β - D - arabinofuranosyl)cytosin-2' - yl 1 - (2',3' - di - O - phenylacetyl - β - D - ribofuranosyl)thymin - 5' - yl phosphate and $N^4$ - benzoyl-1 - (5' - triphenylmethyl - β - D - arabinofuranosyl)cytosin - 3' - yl 1 - (2',3' - di - O - phenylacetyl - β - D-ribofuranosyl)thymin - 5' - yl phosphate which can be separated by chromatography into its components.

Hydrolysis of the dinucleoside phosphate esters with a solution of ammonium hydroxide in ethanol and subsequently with 80% aqueous acetic acid gave the free dinucleoside phosphates, 1 - β - D - arabinofuranosylcytosin - 2' - yl 1 - β - D - ribofuranosylthymin - 5' - yl phosphate and 1 - β - D - arabinofuranosylcytosin - 3'-yl 1 - β - D - ribofuranosylthymin - 5' - yl phosphate, which are separated by chromatography as in Example 113.

EXAMPLE 119

1 - (5'-triphenylmethyl- -D-ribofuranosyl)5-fluorouracil-2' - yl $N^4$-benzoyl-1-(2',3'-di-O-benzoyl-β-D-arabinofuranosyl)5 - methylcytosin - 5' - yl phosphate; 1-(5'-triphenylmethyl - β - D - ribofuranosyl)5-fluorouracil-3' - yl $N^4$-benzoyl-1-(2',3'-di-O-benzoyl-β-D-arabinofuranosyl) - 5 - methylcytosin-5'-yl phosphate; and 1-β - D-ribofuranosyl-5-fluorouracil-2',-yl 1-β-D-arabinofuranosyl - 5 - methylcytosin-5'-yl phosphate and 1-β-D - ribofuranosyl - 5 - fluorouracil-3'-yl-1-β-D-arabinofuranosyl-5-methylcytosin-5'-yl phosphate In the manner given in Example 113 1-(5'-triphenylmethyl-β-D-ribofuranosyl)-5-fluorouracil was reacted with $N^4$ - benzoyl-1-(2',3'-di-O-benzoyl-β-D-arabinofuranosyl) 5-methylcytosine 5'-phosphate in the presence of dicyclohexylcarbodiimide to give a mixture of the two dinucleoside phosphate esters 1-(5-triphenylmethyl-β-D-ribofuranosyl)5 - fluorouracil-2'-yl $N^4$-benzoyl-1-(2',3'-di-O-benzoyl - β - D - arabinofuranosyl)5-methylcytosin-5'-yl phosphate and 1-(5'-triphenylmethyl-β-D-ribofuranosyl) 5 - fluorouracil-3'-yl $N^4$-benzoyl-1-(2',3'-di-O-benzoyl-β-D - arabinofuranosyl)5-methylcytosin - 5'-yl phosphate, which can be separated by chromatography into the two components.

Hydrolysis of the dinucleoside phosphate esters with a solution of ammonium hydroxide in ethanol and subsequently with 80% aqueous acetic acid gave the free dinucleoside phosphates, 1-β-D-ribofuranosyl-5-fluorouracil-2'-yl 1-β-D-arabinofuranosyl-5-methylcytosin-5'-yl phosphate and 1-β-D-ribofuranosyl-5-fluorouracil-3'-yl 1-β-D-arabinofuranosyl-5-methylcytosin-5'-yl phosphate which are separated by chromatography as in Example 113.

EXAMPLE 120

9 - (5' - triphenylmethyl - β - D - arabinofuranosyl)xanthin - 2'-yl $N^2$-decanoyl-9-(2',3'-di-O-decanoyl-β-D-ribofuranosyl)guanin - 5'-yl phosphate, 9-(5'-triphenylmethyl - β - D - arabinofuranosyl)xanthin - 3' - yl $N^2$-decanoyl - 9 - (2',3'-di-O-decanoyl-β-D-ribofuranosyl) guanin - 5' - yl phosphate; and 9-β-D-arabinofuranosylxanthin - 2' - yl 9-β-D-ribofuranosylguanin-5'-yl phosphate and 9-β-D-arabinofuranosylxanthin-3'-yl 9-β-D-ribofuranosylguanin-5'-yl phosphate In the manner given in Example 113 9-(5'-triphenylmethyl-β-D-arabinofuranosyl)xanthine was reacted with $N^2$ - decanoyl-9-(2',3-di-O-decanoyl-β-D-ribofuranosyl) guanine 5'-phosphate in the presence of dicyclohexylcarbodiimide to give a mixture of the two dinucleoside phosphate esters 9 - (5' - triphenylmethyl-β-D-arabinofuranosyl)xanthin - 2' - yl $N^2$ - decanoyl-9-(2',3',-di-O-decanoyl-β-D-ribofuranosyl)guanin-5'-yl phosphate and 9 - (5'-triphenylmethyl-β-D-arabinofuranosyl)xanthin-3'-yl $N^2$-decanoyl-9(2',3'-di-O-decanoyl-β-D-ribofuranosyl) guanin-5'-yl phosphate, which can be separated by chromatography into the components.

Hydrolysis of the above dinucleoside phosphate esters with a solution of ammonium hydroxide in ethanol and subsequently with 80% aqueous acetic acid gave the free dinucleoside phosphates, 9-β-D-arabinofuranosylxanthin-2'-yl 9-β-D-ribofuranosylguanin-5'-yl phosphate and 1-β-D-arabinofuranosylxanthin-3'-yl 1-β-D-ribofuranosylguanin-5'-yl phosphate which are separated by chromatography as in Example 113.

EXAMPLE 121

$N^6$ - anisoyl-9-(5'-triphenylmethyl-β-D-arabinofuranosyl)adenin - 2'-yl 1-(3'-O-benzoyl-β-D-deoxyribofuranosyl) 5 - trifluoromethyluracil-5'-yl phosphate; $N^6$-anisoyl-9-(5' - triphenylmethyl-β-D-arabinofuranosyl)adenin-3'-yl 1-(3'-O-benzoyl-β-D-deoxyribofuranosyl)5-trifluoromethyluracil - 5' - yl phosphate; and 9-β-D-arabinofuranosyladenin - 2'-yl 1-β-D-deoxyribofuranosyl-5-trifluoromethyluracil-5'-yl phosphate and 9-β-D-arabinofuranosyladenin - 3'-yl 1-β-D-deoxyribofuranosyl-5-trifluoromethyluracil-5'-yl phosphate In the manner given in Example 113 $N^6$-anisoyl-9-(5'-triphenylmethyl-β-D-arabinofuranosyladenin was reacted with 1-(3'-O-benzoyl-β-D-deoxyribofuranosyl)5-trifluoromethyluracil 5'-phospate in the presence of dicyclohexylcarbodiimide to give a mixture of the two dinucleoside phosphate esters $N^6$ - anisoyl-9-(5'-triphenylmethyl-β-D-arabinofuranosyl)adenin - 2'-yl 1-(3'-O-benzoyl-β-D-deoxyribofuranosyl)5-trifluoromethyluracil-5'-yl phosphate and $N^6$ - anisoyl - 9 - (5'-triphenylmethyl-β-D-arabinofuranosyl)adenin - 3'-yl 1-(3'-O-benzoyl-β-D-deoxyribofuranosyl)5-trifluoromethyluracil-5'-yl phosphate which are separated by chromatography into the components.

Hydrolysis of the dinucleoside phosphate esters with a solution of ammonium hydroxide in ethanol and subsequently with 80% aqueous acetic acid gave the free dinucleoside phosphates 9-β-D-arabinofuranosyladenin-2'-yl 1 - β-D-deoxyribofuranosyl-5-trifluoromethyluracil-5'-yl phosphate and 9-β-D-arabinofuranosyladenin-3'-yl 1-β - D - deoxyribofuranosyl-5-trifluoromethyluracil-5'-yl phosphate, which are separated by chromatography as in Example 113.

EXAMPLE 122

$N^4$ - anisoyl - 1 - (5'-O-triphenylmethyl-β-D-deoxyribofuranosyl)cytosin - 3' - yl $N^4$ - anisoyl-1-(2',3'-di-O-benzoyl - β - D - ribofuranosyl)cytosin-5'-yl phosphate and 1 - β - D - deoxyribofuranosylcytosin-3'-yl 1-β-D-ribofuranosylcytosin-5'-yl phosphate In the manner given in Example 113, $N^4$-anisoyl-1-(5'-O-triphenylmethyl-β-D-deoxyribofuranosyl)cytosine and $N^4$-anisoyl - 1 - (2',3'-di-O-benzoyl-β-D-ribofuranosyl)cytosin-5'-yl phosphate were reacted at room temperature in pyridine solution in the presence of dicyclohexylcarbodiimide to give the dinucleoside phosphate ester $N^4$-anisoyl-1-(5'-O-triphenylmethyl - β - D - deoxyribofuranosyl)cytosin-3'-yl $N^4$ - anisoyl-1-(2',3'-di-O-benzoyl-β-D-ribofuranosyl)cytosin-5'-yl phosphate.

Selectively hydrolyzing as in Example 113 the above dinucleoside phosphate ester with ammoniacal ethanol and subsequently with 80% aqueous acetic acid produced 1-β-D-deoxyribofuranosylcytosin-3'-yl 1-β-D-ribofuranosylcytosin-5'-yl phosphate.

EXAMPLE 123

$N^6$-anisoyl - 9 - (5' - O-(p-methoxyphenyl)diphenylmethyl-β-D-deoxyribofuranosyl)adenin - 3' - yl $N^4$-benzoyl-(2',3' - di - O - benzoyl-β-D-ribofuransoyl)3-methylcytosin-5'-yl phosphate and 9-β-D-deoxyribofuranosyladenin-3'-yl-1-β-D-ribofuranosyl - 3 - methylcytosin-5'-yl phosphate In the manner given in Example 113, $N^6$-anisoyl-9-(5'-O-(p-methoxyphenyl)diphenylmethyl - β - D - deoxyribofuranosyl)adenine and $N^4$-benzoyl-1-(2',3'-di-O-benzoyl-β-D-ribofuranosyl)3-methylcytosine 5'-phosphate were reacted at room temperature in pyridine solution in the presence of dicyclohexylcarbodiimide to give the dinucleoside phosphate ester $N^6$-anisoyl-9-(5'-O-(p-methoxyphenyl)-diphenylmethyl-β-D-deoxyribofuranosyl)adenin - 3'-yl $N^4$-benzoyl-(2',3'-di-O-benzoyl-β-D-ribofuranosyl)3 - methylcytosin-5-yl phosphate.

Selectively hydrolyzing as in Example 113 the above dinucleoside phosphate ester with ammoniacal ethanol and subsequently with 80% aqueous acetic acid produced 9-β-D-deoxyribofuranosyladenin - 3' - yl 1-β-D-ribofuranosyl-3-methylcytosin-5'-yl phosphate.

EXAMPLE 124

$N^4$ - lauroyl-1-(5'-O-triphenylmethyl-β-D-deoxyribofuranosyl)-5-methylcytosin-3'-yl 1-(2',3'-di-O-hexanoyl - β-D-arabinofuranosyl)uracil-5'-yl phosphate and 1-β-D-deoxyribofuranosyl - 5 - methylcytosin-3'-yl 1-β-D-arabinofuranosyluracil-5'-yl phosphate In the manner given in Example 113 $N^4$-lauroyl-1-(5'-O - triphenylmethyl-β-D-deoxyribofuranosyl)5 - methylcytosine and 1-(2',3'-di-O-hexanoyl-β-D-arabinofuranosyl)uracil-5'-yl phosphate were reacted at room temperature in the presence of dicyclohexylcarbodiimide to give the dinucleoside phosphate ester, $N^4$-lauroyl-1-(5'-O-triphenylmethyl-β-D-deoxyribofuranosyl) - 5 - methylcytosin - 3' - yl 1-(2',3'-di-O-hexanoyl-β-D-arabinofuranosyl)uracil-5'-yl phosphate.

Selectively hydrolyzing the dinucleoside phosphate ester of above with ammonium hydroxide containing ethanol and subsequently with 80% aqueous acetic acid gave 1-β-D-deoxyribofuranosyl-5-methylcytosin-3'-yl 1 - β - D-arabinofuranosyluracil-5'-yl phosphate.

EXAMPLE 125

1 - [5' - O - bis-(p-methoxyphenyl)phenylmethyl-β-D-deoxyribofuranosyl]thymine-3'-yl 9-(2',3'-di-O-benzoyl-β-D-arabinofuranosyl)-6-mercaptopurin-5'-yl phosphate and 1-β-D-deoxyribofuranosylthymin-3'-yl 9-β-D-arabinofuranosyl-6-mercaptopurin-5'-yl phosphate In the manner given in Example 113, 1-[5'-O-bis(p-methoxyphenyl)phenylmethyl - β - D - deoxyribofuranosyl]thymine and 9-(2',3'-di-O-benzoyl-β-D-arabinofuranosyl)-6-mercaptopurin-5'-yl phosphate were reacted at room temperature in the presence of dicyclohexylcarbodiimide to give the dinucleoside phosphate ester, 1-[5'-O-bis(p-methoxyphenyl)phenylmethyl - β - D - deoxyribofuranosyl]thymin-3'-yl 9-(2',3'-di-O-benzoyl-β-D-arabinofuranosyl)6-mercaptopurin-5'-yl phosphate.

Selectively hydrolyzing the dinucleoside phosphate ester of the above with ammonium hydroxide dissolved in ethanol and subsequently with 80% aqueous acetic acid gave 1-β-D-deoxyribofuranosylthymin-3'-yl 9-β-D-arabinofuranosyl-6-mercaptopurin-5'-yl phosphate.

EXAMPLE 126

1-(5'-O-triphenylmethyl - β - D - deoxyribofuranosyl)-5-iodouracil-3'-yl $N^2$ - propionyl-9-(2',3'-di-O-propionyl-β-D-ribofuranosyl)guanin-5'-yl phosphate and 1-β-D-deoxyribofuranosyl-5-iodouracil-3'-yl 9-β-D-ribofuranosylguanin-5'-yl phosphate In the manner given in Example 113, 1-(5'-O-triphenylmethyl-β-D-deoxyribofuranosyl) - 5 - iodouracil and $N^2$-propionyl-9-(2',3'-di-O-propionyl - β - D - ribofuranosyl)guanin-5'-yl phosphate were reacted at room temperature in the presence of dicyclohexylcarbodiimide to give the dinucleoside phosphate ester, 1-(5'-O-triphenylmethyl-β-D-deoxyribofuranosyl)5-iodouracil-3'-yl $N^2$-propionyl-9-(2',3'-di-O-propionyl - β - D - ribofuranosyl)quanin-5'-yl phosphate.

Selectively hydrolyzing the dinucleoside phosphate ester of above with ammonium hydroxide containing ethanol and subsequently with 80% aqueous acetic acid gave 1-β-D-deoxyribofuranosyl - 5 - iodouracil-3'-yl 9-β-D-ribofuranosylguanin-5'-yl phosphate.

EXAMPLE 127

*1 - (5' - triphenylmethyl-β-D-arabinofuranosyl)cytosin-2'-yl N⁶-benzoyl-9-(3'-O-benzoyl - β - D - dexoxyribofuranosyl)adenin-5'-yl phosphate; 1-(5'-triphenylmethyl-β-D-arabinofuranosyl)cytosin-3'-yl N⁶-benzoyl-9-(3'-O - benzoyl-β-D-deoxyribofuranosyl)adenin-5'-yl phosphate; and 1-β-D-arabinosylcytosin-2'-yl 9-β-D-deoxyribofuranosyladenin-5'-yl phosphate and 1-β-D-arabinofuranosylcytosin - 3' - yl - 9 - β - D - deoxyribofuranosyladenin-5'-yl phosphate*

In the manner given in Example 113 1-(5'-triphenylmethyl - β-D - arabinofuranosy)cytosin was reacted with N⁶-benzoyl-9 - (3'-O-benzoyl - β - D-deoxyribofuranosyl)adenin-5'-phosphate in the presence of dicyclohexylcarbodiimide to give a mixture of the two dinucleoside phosphate esters 1-(5-triphenylmethyl-β-D-arabinofuranosyl)cytosin-2'-yl N⁶-benzoyl-9 - (3'-O-benzoyl-β-D-deoxyribofuranosyl)adenin-5'-yl phosphate and 1-(5'-triphenylmethyl-β-D-arabinofuranosyl)cytosin-3'-yl N⁶-benzoyl-9-(3'-O-benzoyl-β-D - deoxyribofuranosy)adenin-5'-yl phosphate, which can be separated by chromatography into the two components.

Hydrolysis of the dinucleoside phosphate esters with a solution of ammonium hydroxide in ethanol and subsequently with 80% aqueous acetic acid gave the free dinucleoside phosphates, 1-β-D-arabinofuranosylcytosin-2'-yl 9-β-D-deoxyribofuranosyladenin-5'-yl phosphate and 1-β-D - arabinofuranosylcytosin-3'-yl 9-β-D-deoxyribofuranosyladenin-5'-yl phosphate which are separated by chromatography as in Example 113.

EXAMPLE 128

*1-(5'-triphenylmethyl-β-D - arabinofuranosyl)cytosin-2'-yl N²-benzoyl-9-(2',3'-di-O - benzoyl - β-D-ribofuranosyl)guanin-5'-yl phosphate, 1-(5'triphenylmethyl-β-D-arabinofuranosyl)cytosin-3'-yl N²-benzoyl-9-(2',3'-di-O-benzoyl-β-D-ribofuranosyl)guanin-5'-yl phosphate ; and 1-β-D-arabinofuranosylcytosin-2'-yl 9-β-D-ribofuranosylguanin-5'-yl phosphate and 1-β-D-arabinofuranosylcytosin-3'-yl 9-β-D-ribofuranosylguanin-5'-yl phosphate*

In the manner given in Example 113 1-(5'-triphenylmethyl-β-D-arabinofuranosyl)cytosin was reacted with N²-benzoyl-9 - (2',3'-di-O - benzoyl-β-D - ribofuranosyl)guanin-5'-phosphate in the presence of dicyclohexylcarbodiimide to give a mixture of the two dinucleoside phosphate esters 1-(5'-triphenylmethyl-β-D-arabinofuranosyl)cytosin-2'-yl N²-benzoyl-9 - (2',3'-di-O-benzoyl-β-D-ribofuranosyl)guanin - 5'-yl phosphate and 1-(5'-triphenylmethyl-β-D-arabinofuranosylcytosin-3'-yl N²-benzoyl-9-(2',3'-di-O-benzoyl-β-D-ribofuranosyl)guanin-5'-yl phosphate.

Hydrolysis of the dinucleoside phosphate esters with a solution of ammonium hydroxide in ethanol and subsequently with 80% aqueous acetic acid gave the free dinucleoside phosphates, 1-β-D-arabinofuranosylcytosin-2'-yl 9-β-D-ribofuranosylguanin-5'-yl phosphate and 1-β-D-arabinofuranosylcytosin-3'-yl 9-β-D-ribofuranosylguanin-5'-yl phosphate which are separated by chromatography as in Example 113.

In the manner given in Example 113, other dinucleoside phosphates of structural Formulae XI and XII can be prepared by reacting selected nucleosides of Formulae II or VIII with a nucleotide of Formula VI and hydrolyzing the resulting ether esters of Formulae IX and X with a base and then an acid. Representative compounds (XI and XII) thus-obtained include:

1-β-D-arabinofuranosylcytosin-3'-yl 1-β-D-arabinofuranosylthym-5'-yl phosphate;
1-β-D-arabinofuranosylcytosin-2'-yl 1-β-D-arabinofuranosylthymin-5'-yl phosphate;
9-β-D-arabinofuranosyladenin-3'-yl 9-β-D-arabinofuranosylxanthin-5'-yl phosphate;
9-β-D-arabinofuranosyladenin-2'-yl 9-β-D-arabinofuranosylxanthin-5'-yl phosphate;
9-β-D-arabinofuranosylhypoxanthin-3'-yl 9-β-D-arabinofuranosyl-6-mercaptopurin-5'-yl phosphate;
9-β-D-arabinofuranosylhypoxanthin-2'-yl 9-β-D-arabinofuranosyl-6-mercaptopurin-5'-yl phosphate;
1-β-D-arabinofuranosyl-5-fluorouracil-3'-yl 1-β-D-arabinofuranosyl-5-fluorouracil-5'-yl phosphate;
1-β-D-arabinofuranosyl-5-fluorouracil-2'-yl 1-β-D-arabinofuranosyl-5-fluorouracil-5'-yl phosphate;
1-β-D-arabinofuranosylthymin-3'-yl 9-β-D-ribofuranosylguanin-5'-yl phosphate;
1-β-D-arabinofuranosylthymin-2'-yl 9-β-D-ribofuranosylguanin-5'-yl phosphate;
1-β-D-arabinofuranosyl-3-methylcytosin-3'-yl 1-β-D-ribofuranosyl-5-chlorouracil-5'-yl phosphate;
1-β-D-arabinofuranosyl-3-methylcytosin-2'-yl 1-β-D-ribofuranosyl-5-chlorouracil-5'-yl phosphate;
1-β-D-arabinofuranosyl-5-iodouracil-3'-yl 1-β-D-ribofuranosyl-3-uracil-5'-yl phosphate;
1-β-D-arabinofuranosyl-5-iodouracil-2'-yl 1-β-D-ribofuranosyl-3-uracil-5'-yl phosphate;
1-β-D-arabinofuranosyl-5-bromouracil-3'-yl 1-β-D-ribofuranosyl-3-methylcytosin-5'-yl phosphate;
1-β-D-arabinofuranosyl-5-bromouracil-2'-yl 1-β-D-ribofuranosyl-3-methylcytosin-5'-yl phosphate;
1-β-D-ribofuranosylcytosin-2'-yl 9-β-D-arabinofuranosylxanthin-5'-yl phosphate;
1-β-D-ribofuranosylcytosin-3'-yl 9-β-D-arabinofuranosylxanthin-5'-yl phosphate;
1-β-D-ribofuranosyluracil-2'-yl 9-β-D-arabinofuranosylhypoxanthin-5'-yl phosphate;
1-β-D-ribofuranosyluracil-3'-yl 9-β-D-arabinofuranosylhypoxanthin-5'-yl phosphate;
9-β-D-ribofuranosyl-6-mercaptopurin-2'-yl 1-β-D-arabinofuranosyl-5-fluorouracil-5'-yl phosphate;
9-β-D-ribofuranosyl-6-mercaptopurin-3'-yl 1-β-D-arabinofuranosyl-5-fluorouracil-5'-yl phosphate;
9-β-D-ribofuranosyladenin-2'-yl 1-β-D-arabinofuranosyl-5-iodouracil-5'-yl phosphate;
9-β-D-ribofuranosyladenin-3'-yl 1-β-D-arabinofuranosyl-5-iodouracil-5'-yl phosphate;
9-β-D-deoxyribofuranosyl-6-mercaptopurin-3'-yl 1-β-D-arabinofuranosyl-5-bromouracil-5'-yl phosphate;
1-β-D-deoxyribofuranosylthymin-3'-yl 1-β-D-arabinofuranosylthymin-5'-yl phosphate;
9-β-D-deoxyribofuranosylguanin-3'-yl 1-β-D-arabinofuranosyl uracil-5'-yl phosphate;
9-β-D-deoxyribofuranosyltrifluoromethyluracil-3-'yl 9-β-D-arabinofuranosylxanthin-5'-yl phosphate;
1-β-D-deoxyribofuranosyl-3-methylcytosin-3'-yl 1-β-D-arabinofuranosylthymin-5'-yl phosphate;
1-β-D-ribofuranosyl-5-methylcytosin-3'-yl 9-β-D-arabinofuranosyladenin-5'-yl;
1-β-D-deoxyribofuranosyl-5-fluorouracil-3'-yl 1-β-D-arabinofuranosyl-5-chlorouracil-5'-yl phosphate;
1-β-D-arabinofuranosyl-5-fluorouracil-2'-yl 1-β-D-deoxyribofuranosyl-5-chlorouracil-5'-yl phosphate;
1-β-D-arabinofuranosyl-5-fluorouracil-3'-yl 1-β-D-deoxyribofuranosyl-5-chlorouracil-5'-yl phosphate;
9-β-D-arabinofuranosyladenin-2'-yl 9-β-D-deoxyribofuranosylhypoxanthin-5'-yl phosphate;
9-β-D-arabinofuranosyladenin-3'-yl 9-β-D-deoxyribofuranosylhypoxanthin-5'-yl phosphate;
1-β-D-arabinofuranosyl-3-methylcytosin-2'-yl 1-β-D-deoxyribofuranosyl-5-fluorouracil-5'-yl phosphate;
1-β-D-arabinofuranosyl-3-methylcytosin-3'-yl 1-β-D-deoxyribofuranosyl-5-fluorouracil-5'-yl phosphate;
9-β-D-arabinofuranosylxanthin-2'-yl 1-β-D-deoxyribofuranosyl-3-uracil-5'-yl phosphate;
9-β-D-arabinofuranosylxanthin-3'-yl 1-β-D-deoxyribofuranosyl-3-uracil-5'-yl phosphate;
1-β-D-ribofuranosyl-3-methylcytosin-2'-yl 9-β-D-deoxyribofuranosyladenin-5'-yl phosphate;

1-β-D-ribofuranosyl-3-methylcytosin-3'-yl 9-β-D-deoxyribofuranosyladenin-5'-yl phosphate;
1-β-D-ribofuranosylguanin-2'-yl 9-β-D-deoxyribofuranosylhypoxanthin-5'-yl phosphate;
9-β-D-ribofuranosylguanin-3'-yl 9-β-D-deoxyribofuranosylhypoxanthin-5'-yl phosphate;
1-β-D-ribofuranosyl-5-bromouracil-2'-yl 1-β-D-deoxyribofuranosyl-5-methylcytosin-5'-yl phosphate;
1-β-D-ribofuranosyl-5-bromouracil-3'-yl 1-β-D-deoxyribofuranosyl-5-methylcytosin-5'-yl phosphate;
9-β-D-ribofuranosyl-6-mercaptopurin-2'-yl 1-β-D-deoxyribofuranosyl-5-bromouracil-5'-yl phosphate;
9-β-D-ribofuranosyl-6-mercaptopurin-3'-yl 1-β-D-deoxyribofuranosyl-5-bromouracil-5'-yl phosphate;
9-β-B-deoxyribofuranosyl-6-mercaptopurin-3'-yl 1-β-D-deoxyribofuranosyl-5-iodouracil-5'-yl phosphate;
9-β-D-deoxyribofuranosylhypoxanthin-3'-yl 9-β-D-deoxyribofuranosylhypoxanthin-5'-yl phosphate;
3-β-D-deoxyribofuranosyl-3-uracil-3'-yl 1-β-D-deoxyribofuranosylthymin-5'-yl phosphate;
1-β-D-deoxyribofuranosylthymin-3'-yl 9-β-D-deoxyribofuranosylxanthin-5'-yl phosphate;
9-β-D-deoxyribofuranosyladenin-3'-yl 1-β-D-deoxyribofuranosyl-5-iodouracil-5'-yl phosphate;
9-β-deoxyribofuranosylhypoxanthin-3'-yl 9-β-D-deoxyribofuranosylhypoxanthin-5'-yl phosphate, and the like.

I claim:
1. A dinucleoside phosphate selected from the group consisting of compounds of the structures:

β-OH, β-OH; and wherein $Y_1$ and $Y_2$ are selected from the group consisting of cytosin-1-yl, uracil-1-yl, thymin-1-yl, adenin-9-yl, guanin-9-yl, 6-mercaptopurin-9-yl, uracil-3-yl, 5-fluorouracil-1-yl, 5-chlorouracil-1-yl, 5-bromouracil-1-yl, 5-iodouracil-1-yl, 5-trifluoromethyluracil-1-yl, hypoxanthin-9-yl, xanthin-9-yl, 5-methylcytosin-1-yl, and 3-methylcytosin-1-yl, and the pharmaceutically acceptable salt thereof.

2. 1-β-D-arabinofuranosylcytosin-3'-yl 1-β-D-deoxyribofuranosyluracil-5'-yl phosphate.
3. 1-β-D-arabinofuranosylcytosin-2'-yl 1-β-D-deoxyribofuranosyluracil-5'-yl phosphate.
4. 1-β-D-deoxyribofuranosylthymin-3'-yl 1-β-D-arabinofuranosylcytosin-5'-yl phosphate.
5. 1-β-D-deoxyribofuranosylthymin-3'-yl 1-β-D-arabinofuranosylcytosin-5'-yl phosphate triethylamine salt.
6. 1-β-D-deoxyribofuranosylthymin-3'-yl 1-β-D-arabinofuranosylcytosin-5'-yl phosphate pyridine salt.
7. 1-β-D-arabinofuranosylcytosin-3'-yl 1-β-D-arabinofuranosylcytosin-5'-yl phosphate.
8. 1-β-D-arabinofuranosylcytosin-2'-yl 1-β-D-arabinofuranosylcytosin-5'-yl phosphate.
9. 1-β-D-arabinofuranosylcytosin-2'-yl 1-β-D-ribofuranosylthymin-5'-yl phosphate.
10. 1-β-D-arabinofuranosylcytosin-3'-yl 1-β-D-ribofuranosylthymin-5'-yl phosphate.
11. 1-β-D-arabinofuranosylcytosin-2'-yl 9-β-D-ribofuranosyladenin-5'-yl phosphate.
12. 1-β-D-arabinofuranosylcytosin-3'-yl 9-β-D-ribofuranosyladenin-5'-yl phosphate.
13. 1-β-D-arabinofuranosylcytosin-2'-yl 9-β-D-deoxyribofuranosyladenin-5'-yl phosphate.

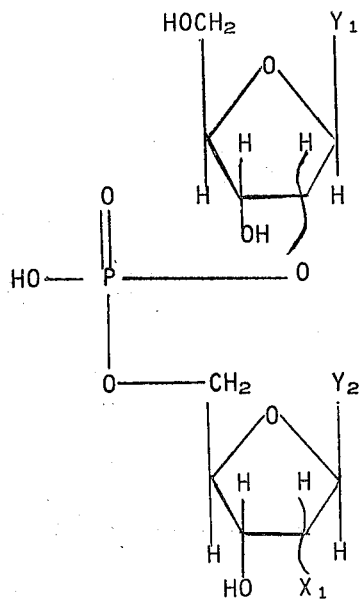

(XI)

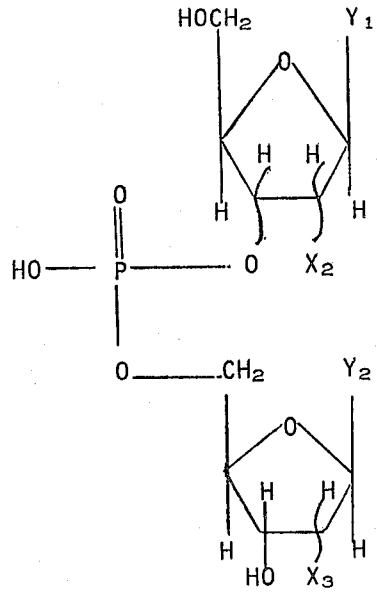

(XII)

wherein $X_1$ is selected from the group consisting of hydrogen, α-hydroxy and β-hydroxy with the proviso that only one of the furanose rings in the same compound can be a ribofuranose, wherein the combination $X_2$ and $X_3$ is selected from the group of combinations consisting of H, α-OH; H, β-OH; α-OH, β-OH; β-OH, α-OH; and 14. 1-β-D-arabinofuranosylcytosin-3'-yl 9-β-D-deoxyribofuranosyladenin-5'-yl phosphate.
15. 1-β-D-arabinofuranosylcytosin-2'-yl 9-β-D-ribofuranosylguanine-5'-yl phosphate.
16. 1-β-D-arabinofuranosylcytosin-3'-yl 9-β-D-ribofuranosylguanin-5'-yl phosphate.

17. A dinucleoside phosphate selected from the group consisting of compounds of the structure

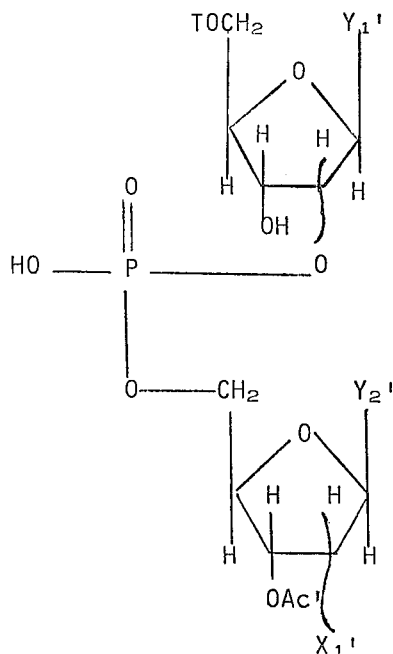 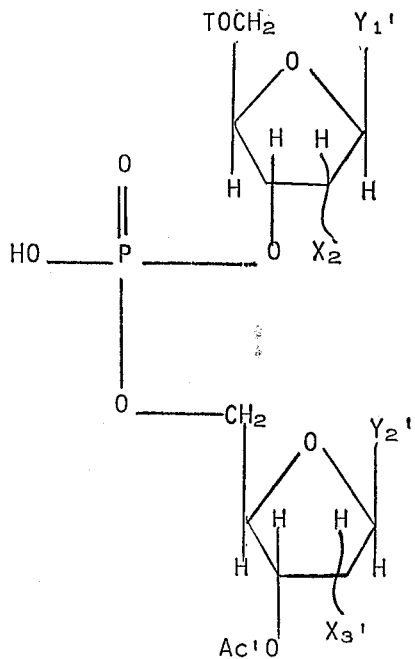

wherein Ac' is the acyl group of a hydrocarbon carboxylic acid containing from 2 to 12 carbon atoms, inclusive, wherein T is selected from the group consisting of triphenylmethyl, (p-methoxyphenyl)diphenylmethyl and bis(p-methoxyphenyl)phenylmethyl, wherein $X_1'$ is selected from the group consisting of hydrogen, α-O-acyl and β-O-acyl in which acyl is the acyl group of a hydrocarbon carboxylic acid, defined as above, with the proviso that only one of the furanose rings in the same compound can be a ribofuranose, wherein the combination $X_2$ and $X_3'$ is selected from the group consisting of the combinations H, α-O-acyl; H, β-O-acyl; α-OH, β-O-acyl; β-OH, α-O-Ac; and β-OH, β-OAc in which acyl is defined as hereinabove, wherein $Y_1'$ and $Y_2'$ are selected from the group consisting of N-acylcytosin-1-yl, N-acyladenin-9-yl, N-acylguanin-9-yl, N-acyl-5-methylcytosin-1-yl, N-acyl-3-methylcytosin-1-yl, uracil-1-yl, thymin-1-yl, hypoxanthin-9-yl, 6-mercaptopurin-9-yl, uracil-3-yl, 5-fluorouracil-1-yl, 5-chlorouracil-1-yl, 5-bromouracil-1-yl, 5-iodouracil-1-yl, 5-trifluoromethyluracil-1-yl and xanthin-9-yl in which the acyl group is defined hereinabove.

18. 1 - (3' - acetyl-β-D-deoxyribofuranosyl)uracil-5'-yl $N^4$ - anisoyl-1-[5'-(p-methoxyphenyl)diphenylmethyl-β-D-arabinofuranosyl]cytosin-2'-yl phosphate.

19. 1 - (3' - acetyl-β-D-deoxyribofuranosyl)uracil-5'-yl $N^4$ - anisoyl-1-[5'-(p-methoxyphenyl)diphenylmethyl-β-D-arabinofuranosyl]cytosin-3'-yl phosphate.

20. 1 - (5' - triphenylmethyl-β-D-deoxyribofuranosyl)thymin-3'-yl $N^4$-benzoyl-1-(2',3'-diacetyl-β-D-arabinofuranosyl)cytosin-5'-yl phosphate.

21. $N^4$ - anisoyl-1-(5'-O-triphenylmethyl-β-D-arabinofuranosyl)-cytosin-3'-yl $N^4$-anisoyl-(2',3'-di-O-benzoyl-β-D-arabinofuranosyl)cytosin-5'-yl phosphate.

22. A process for the preparation of a dinucleoside phosphate selected from the group consisting of compounds of the structures:

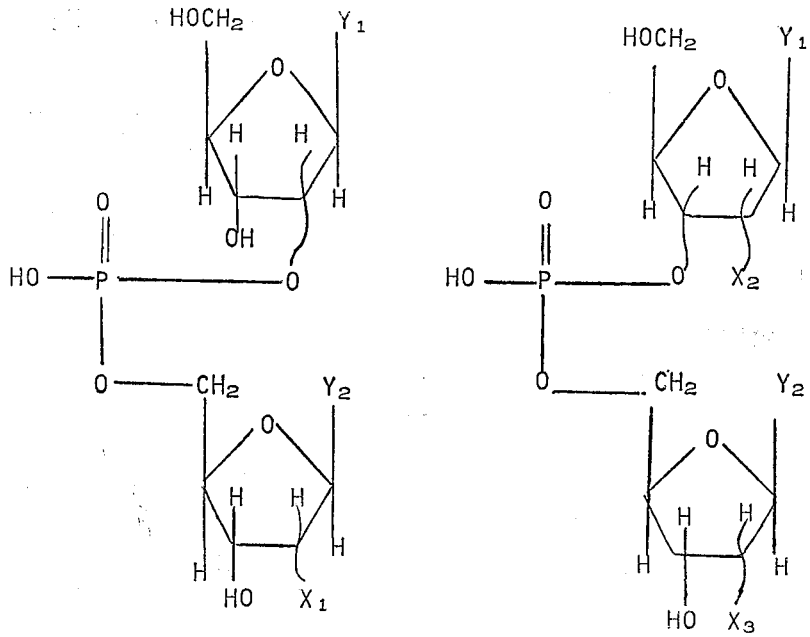

wherein $X_1$ is selected from the group consisting of hydrogen, α-hydroxy β-hydroxy with the proviso that only one of the furanose rings in the same compound can be a ribofuranose, wherein the combination $X_2$ and $X_3$ is selected from the group of combinations consisting of H, α-OH; H, β-OH; α-OH, β-OH; β-OH; α-OH; and β-OH, β-OH; and wherein $Y_1$ and $Y_2$ are selected from the group consisting of cytosin-1-yl, uracil-1-yl, thymin-1-yl, adenin-9-yl, guanin-9-yl, 6-mercaptopurin-9-yl, uracil-3-yl, 5-fluorouracil-1-yl, 5-chlorouracil-1-yl, 5-bromouracil-1-yl, 5-iodouracil-1-yl, 5-trifluoromethyluracil-1-yl, hypoxanthin-9-yl, xanthin-9-yl, 5-methylcytosin-1-yl, and 3-methylcytosin-1-yl, and the pharmaceutically acceptable acid addition salt thereof, which comprises: reacting a nucleoside selected from the nucleosides of formulae II and VIII

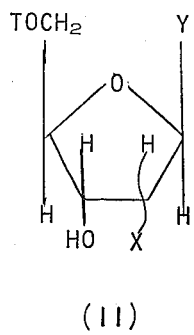

(II)

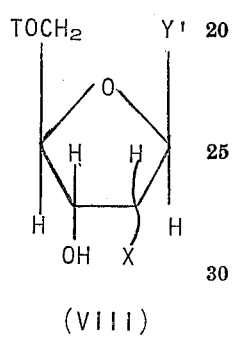

(VIII)

wherein T is selected from the group consisting of triphenylmethyl, (p-methoxyphenyl)diphenylmethyl and bis(p-methoxyphenyl)phenylmethyl; wherein X is selected from the group consisting of hydrogen, α-OH and β-OH, wherein Y is identical with $Y_1$ defined as above, and wherein Y' signifies a group of radicals like Y in which amino and imino group containing radicals are acylated on said groups, with a nucleoside phosphate of the structure VI:

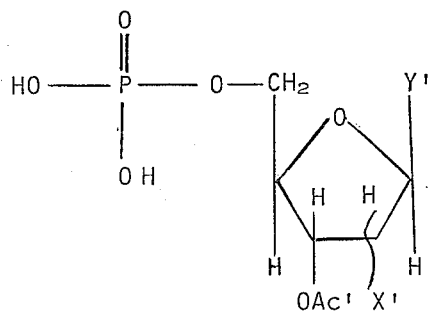

wherein X' is selected from the group consisting of hydrogen, α-O-acyl and β-O-acyl in which acyl is the acyl radical of a hydrocarbon carboxylic acid containing from 2 to 12 carbon atoms inclusive and Y' has the same significance as above, with the proviso that the nucleoside and nucleoside phosphate to be combined are selected from the combinations consisting of arabinofuranoside-arabinofuranoside, ribofuranoside-arabinofuranoside, deoxyribofuranoside-arabinofuranoside, and ribofuranoside-deoxyribofuranoside, in the presence of a dialkyl-carbodiimide to give a compound selected from the group consisting of dinucleosides of structures:

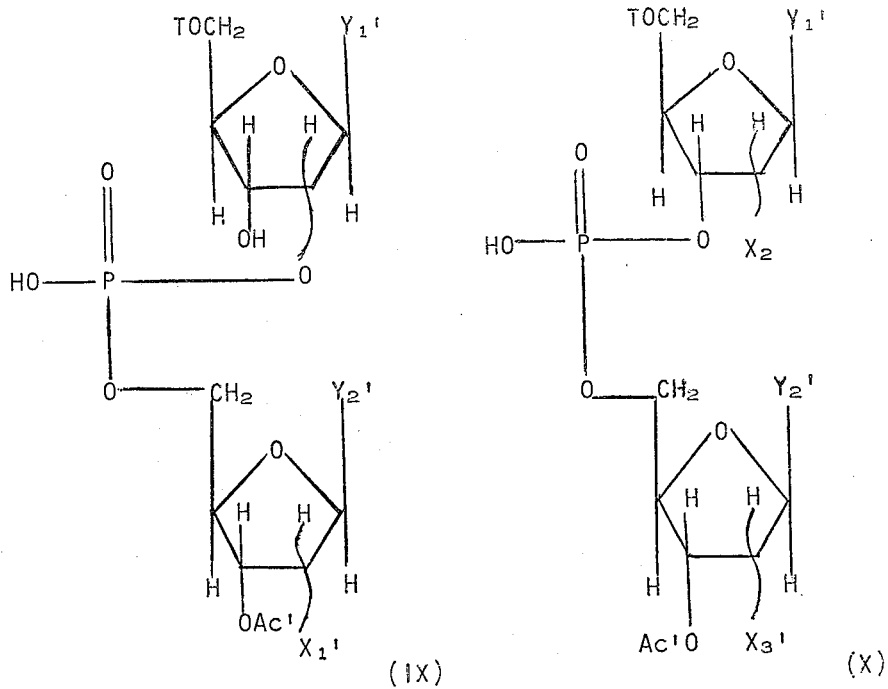

wherein T and $X_2$ have the significance as above and wherein $X_1'$ and $X_3'$ have the significance of X' as defined above and $Y_1'$ and $Y_2'$ have the significance of Y' as defined above; and wherein Ac' is an acyl radical defined as Ac; and hydrolyzing these compounds with a mild base followed by a mild hydrolysis with an aqueous acid to obtain the compounds of Formulae XI and XII.

23. The process of claim 17 wherein the dialkylcarbodiimide is dicyclohexylcarbodiimide.

24. The process of claim 17 wherein the dialkylcarbodiimide is dicyclohexylcarbodiimide and the hydrolyzing agent is ammonium hydroxide in a lower alkanol.

25. The process of claim 19 wherein the compounds of formulae XI and XII are separated from each other by chromatography.

No references cited.

LEWIS GOTTS, *Primary Examiner.*

J. R. BROWN, *Assistant Examiner.*